United States Patent
Switkes et al.

(10) Patent No.: US 10,899,323 B2
(45) Date of Patent: Jan. 26, 2021

(54) DEVICES, SYSTEMS, AND METHODS FOR VEHICLE BRAKING

(71) Applicant: Peloton Technology, Inc., Mountain View, CA (US)

(72) Inventors: Joshua P. Switkes, Mountain View, CA (US); Stephen M. Erlien, Mountain View, CA (US)

(73) Assignee: Peloton Technology, Inc., Mountain View, CA (US)

( * ) Notice: Subject to any disclaimer, the term of this patent is extended or adjusted under 35 U.S.C. 154(b) by 142 days.

(21) Appl. No.: 16/029,625

(22) Filed: Jul. 8, 2018

(65) Prior Publication Data
US 2020/0010062 A1 Jan. 9, 2020

(51) Int. Cl.
*B60T 7/22* (2006.01)
*B60T 8/18* (2006.01)

(52) U.S. Cl.
CPC .............. *B60T 7/22* (2013.01); *B60T 8/1887* (2013.01); *B60T 2201/02* (2013.01)

(58) Field of Classification Search
CPC .... B60T 2201/02; B60T 2210/36; B60T 7/18; B60T 7/22; B60T 8/17; B60T 8/1887; G01S 17/00; G01S 17/931; G01S 2013/931; G01S 2013/932; G01S 2013/9323; G01S 2013/9325
See application file for complete search history.

(56) References Cited

U.S. PATENT DOCUMENTS

| 5,166,881 | A | 11/1992 | Akasu |
| 5,295,551 | A | 3/1994 | Sukonick |
| 5,331,561 | A | 7/1994 | Barrett et al. |
| 5,572,449 | A | 11/1996 | Tang et al. |
| 5,680,122 | A | 10/1997 | Mio |
| 5,777,451 | A | 7/1998 | Kobayashi et al. |

(Continued)

FOREIGN PATENT DOCUMENTS

| EP | 0982173 A2 | 3/2000 |
| EP | 0991046 A1 | 4/2000 |

(Continued)

OTHER PUBLICATIONS

"Automated Highway System: Milestone 2 Report, Task C2: Downselect System Configurations and Workshop #3" (National Automated Highway System Consortium, Troy, MI, Jun. 1997), 604 pages.

(Continued)

*Primary Examiner* — Tyler J Lee
(74) *Attorney, Agent, or Firm* — Redbrick IP, P.C.

(57) ABSTRACT

Systems and methods are described for coordinating and controlling vehicles, for example heavy trucks, to follow closely to behind each other, or linking to form a platoon. In one aspect, on-board controllers in each vehicle interact with vehicle sensors to monitor and control, for example, gross vehicle weight, axle loads, and stopping distance. In some aspects, two vehicles can determine information associated with their gross weight and axle load, and apply that information to assist with determining a bounding box indicating which vehicle will take longer to stop. Based on which vehicle will take longer to stop, an order of vehicles in a potential platoon is determined.

20 Claims, 12 Drawing Sheets

(56) References Cited

U.S. PATENT DOCUMENTS

| | | |
|---|---|---|
| 5,781,119 A | 7/1998 | Yamashita et al. |
| 6,032,097 A | 2/2000 | Iihoshi et al. |
| 6,125,321 A | 9/2000 | Tabata et al. |
| 6,128,559 A | 10/2000 | Saitou et al. |
| 6,188,950 B1 | 2/2001 | Tsutsumi et al. |
| 6,265,990 B1 | 7/2001 | Isogai et al. |
| 6,285,929 B1 | 9/2001 | Hashimoto |
| 6,356,820 B1 | 3/2002 | Hashimoto et al. |
| 6,397,149 B1 | 5/2002 | Hashimoto |
| 6,418,370 B1 | 7/2002 | Isogai et al. |
| 6,484,078 B1 | 11/2002 | Kageyama |
| 6,633,006 B1 | 10/2003 | Wolf et al. |
| 6,963,795 B2 | 11/2005 | Haissig et al. |
| 7,286,825 B2 | 10/2007 | Shishido et al. |
| 7,554,435 B2 | 6/2009 | Tengler et al. |
| 7,593,811 B2 | 9/2009 | Schmidt et al. |
| 7,782,227 B2 | 8/2010 | Boss et al. |
| 8,116,921 B2 | 2/2012 | Ferrin et al. |
| 8,275,491 B2 | 9/2012 | Ferrin et al. |
| 8,326,473 B2 | 12/2012 | Simpson et al. |
| 8,352,111 B2 | 1/2013 | Mudalige |
| 8,352,112 B2 | 1/2013 | Mudalige |
| 8,442,735 B2 | 5/2013 | Hrovat et al. |
| 8,538,656 B2 | 9/2013 | Yamashiro |
| 8,620,517 B2 | 12/2013 | Caveney et al. |
| 8,660,779 B2 | 2/2014 | Shida |
| 8,666,587 B2 | 3/2014 | Anderson |
| 8,676,466 B2 | 3/2014 | Mudalige |
| 8,688,349 B2 | 4/2014 | Grolle et al. |
| 8,744,666 B2 | 6/2014 | Switkes et al. |
| 8,775,060 B2 | 7/2014 | Solyom et al. |
| 8,798,887 B2 | 8/2014 | Nickolaou et al. |
| 8,798,907 B2 | 8/2014 | Shida |
| 8,922,391 B2 | 12/2014 | Rubin et al. |
| 8,947,531 B2 | 2/2015 | Fischer et al. |
| 8,948,995 B2 | 2/2015 | Pandita et al. |
| 9,037,389 B2 | 5/2015 | You |
| 9,079,587 B1 | 7/2015 | Rupp et al. |
| 9,141,112 B1 | 9/2015 | Loo et al. |
| 9,224,300 B2 | 12/2015 | Lee et al. |
| 9,290,069 B2* | 3/2016 | Singh .................. B60C 23/064 |
| 9,355,423 B1 | 5/2016 | Slusar |
| 9,396,661 B2 | 7/2016 | Okamoto |
| 9,423,794 B2 | 8/2016 | Lind et al. |
| 9,494,944 B2 | 11/2016 | Alam et al. |
| 9,582,006 B2 | 2/2017 | Switkes et al. |
| 9,598,078 B2 | 3/2017 | Moran et al. |
| 9,616,743 B1 | 4/2017 | Mays et al. |
| 9,632,507 B1 | 4/2017 | Korn |
| 9,645,579 B2 | 5/2017 | Switkes et al. |
| 9,665,102 B2 | 5/2017 | Switkes et al. |
| 9,721,474 B2 | 8/2017 | Eskilson |
| 9,771,070 B2 | 9/2017 | Zagorski et al. |
| 9,799,224 B2 | 10/2017 | Okamoto |
| 9,823,166 B2 | 11/2017 | Dudar et al. |
| 9,841,762 B2 | 12/2017 | Moran et al. |
| 9,869,560 B2 | 1/2018 | Gordon et al. |
| 9,878,657 B2 | 1/2018 | Wunsche et al. |
| 9,927,816 B2 | 3/2018 | Li et al. |
| 9,928,746 B1 | 3/2018 | MacNeille et al. |
| 9,940,840 B1 | 4/2018 | Schubert et al. |
| 10,013,877 B2 | 7/2018 | Lu et al. |
| 10,017,039 B1 | 7/2018 | Colavincenzo |
| 10,017,179 B2 | 7/2018 | Alden et al. |
| 10,027,024 B2 | 7/2018 | Powell |
| 10,031,522 B2 | 7/2018 | Moran et al. |
| 10,042,365 B2 | 8/2018 | Switkes et al. |
| 10,074,894 B1 | 9/2018 | Birnbaum et al. |
| 10,078,338 B2 | 9/2018 | Smartt et al. |
| 10,549,732 B2* | 2/2020 | Kasper .................. B60T 8/172 |
| 10,768,635 B2* | 9/2020 | Cha .......................... G08G 1/22 |
| 2001/0001138 A1 | 5/2001 | Zhu et al. |
| 2002/0198632 A1 | 12/2002 | Breed et al. |
| 2004/0078133 A1 | 4/2004 | Miller et al. |
| 2004/0140143 A1 | 7/2004 | Saeki et al. |
| 2006/0095195 A1 | 5/2006 | Nishimura et al. |
| 2006/0229804 A1 | 10/2006 | Schmidt et al. |
| 2007/0043502 A1 | 2/2007 | Mudalige et al. |
| 2007/0213915 A1 | 9/2007 | Tange et al. |
| 2007/0233337 A1 | 10/2007 | Plishner |
| 2008/0009985 A1 | 1/2008 | Plishner |
| 2008/0059007 A1 | 3/2008 | Whittaker et al. |
| 2009/0012666 A1 | 1/2009 | Simpson et al. |
| 2009/0079839 A1 | 3/2009 | Fischer et al. |
| 2009/0164082 A1 | 6/2009 | Kobayashi et al. |
| 2009/0204303 A1* | 8/2009 | Leschuk .................. B60T 7/12 |
| | | 701/71 |
| 2009/0222186 A1 | 9/2009 | Jensen |
| 2009/0287412 A1 | 11/2009 | Menzel et al. |
| 2010/0049374 A1 | 2/2010 | Ferrin et al. |
| 2010/0094509 A1 | 4/2010 | Lake et al. |
| 2010/0256835 A1 | 10/2010 | Mudalige |
| 2010/0256836 A1 | 10/2010 | Mudalige |
| 2010/0256852 A1 | 10/2010 | Mudalige |
| 2011/0010022 A1 | 1/2011 | Beavin |
| 2011/0118967 A1 | 5/2011 | Tsuda |
| 2011/0184596 A1 | 7/2011 | Andreasson |
| 2011/0184605 A1 | 7/2011 | Neff |
| 2011/0270514 A1 | 11/2011 | Shida |
| 2011/0270520 A1 | 11/2011 | Kronenberg |
| 2011/0301779 A1 | 12/2011 | Shida |
| 2012/0109421 A1 | 5/2012 | Scarola |
| 2012/0123660 A1 | 5/2012 | Kagawa et al. |
| 2012/0239268 A1 | 9/2012 | Chen et al. |
| 2012/0252415 A1 | 10/2012 | Menzel et al. |
| 2012/0259516 A1 | 10/2012 | Grolle et al. |
| 2012/0259538 A1 | 10/2012 | Oexmann |
| 2013/0015984 A1 | 1/2013 | Yamashiro |
| 2013/0024084 A1 | 1/2013 | Yamashiro |
| 2013/0030606 A1 | 1/2013 | Mudalige et al. |
| 2013/0041567 A1 | 2/2013 | Yamashiro |
| 2013/0041576 A1 | 2/2013 | Switkes et al. |
| 2013/0066511 A1 | 3/2013 | Switkes et al. |
| 2013/0079953 A1 | 3/2013 | Kumabe |
| 2013/0080040 A1 | 3/2013 | Kumabe |
| 2013/0080041 A1 | 3/2013 | Kumabe |
| 2013/0081451 A1* | 4/2013 | Kamada .................. B60P 1/045 |
| | | 73/65.01 |
| 2013/0116861 A1 | 5/2013 | Nemoto |
| 2013/0124064 A1 | 5/2013 | Nemoto |
| 2013/0144465 A1 | 6/2013 | Shida |
| 2013/0144502 A1 | 6/2013 | Shida |
| 2013/0151058 A1 | 6/2013 | Zagorski et al. |
| 2013/0173114 A1 | 7/2013 | Pillai |
| 2013/0211624 A1 | 8/2013 | Lind et al. |
| 2013/0218365 A1 | 8/2013 | Caveney et al. |
| 2013/0325306 A1 | 12/2013 | Caveney et al. |
| 2014/0005906 A1 | 1/2014 | Pandita et al. |
| 2014/0019031 A1 | 1/2014 | Solyom et al. |
| 2014/0067220 A1 | 3/2014 | Seiler |
| 2014/0100734 A1 | 4/2014 | Yamashiro |
| 2014/0107867 A1 | 4/2014 | Yamashiro |
| 2014/0129075 A1 | 5/2014 | Carleton |
| 2014/0142799 A1 | 5/2014 | Ferguson et al. |
| 2014/0145838 A1 | 5/2014 | Tuukkanen |
| 2014/0148994 A1 | 5/2014 | Ando |
| 2014/0172265 A1 | 6/2014 | Funabashi |
| 2014/0197967 A1 | 7/2014 | Modica et al. |
| 2014/0236449 A1 | 8/2014 | Horn |
| 2014/0244144 A1 | 8/2014 | You |
| 2014/0297063 A1 | 10/2014 | Shida |
| 2014/0303870 A1 | 10/2014 | Switkes et al. |
| 2014/0309836 A1 | 10/2014 | Ollis |
| 2014/0316671 A1 | 10/2014 | Okamoto |
| 2014/0316865 A1 | 10/2014 | Okamoto |
| 2014/0324786 A1* | 10/2014 | Li .......................... G06F 16/215 |
| | | 707/690 |
| 2014/0350756 A1 | 11/2014 | Schoonmaker et al. |
| 2015/0045993 A1 | 2/2015 | Cooper et al. |
| 2015/0100192 A1 | 4/2015 | Lee et al. |
| 2015/0100273 A1* | 4/2015 | Safdar .................... G01G 19/08 |
| | | 702/175 |
| 2015/0120137 A1 | 4/2015 | Zeng et al. |
| 2015/0151737 A1 | 6/2015 | Birch et al. |

(56) References Cited

U.S. PATENT DOCUMENTS

| | | |
|---|---|---|
| 2015/0153733 A1 | 6/2015 | Ohmura et al. |
| 2015/0161894 A1 | 6/2015 | Duncan et al. |
| 2015/0217607 A1* | 8/2015 | Singh .................. B60W 40/103 152/510 |
| 2015/0262481 A1 | 9/2015 | Selin |
| 2015/0296019 A1 | 10/2015 | Onishi et al. |
| 2015/0314790 A1 | 11/2015 | Deragarden et al. |
| 2016/0009284 A1 | 1/2016 | Tokimasa et al. |
| 2016/0019782 A1 | 1/2016 | Alam et al. |
| 2016/0026187 A1 | 1/2016 | Alam et al. |
| 2016/0054735 A1 | 2/2016 | Switkes et al. |
| 2016/0198303 A1 | 7/2016 | Grotendorst et al. |
| 2016/0267796 A1 | 9/2016 | Hiroma et al. |
| 2017/0011633 A1 | 1/2017 | Boegel |
| 2017/0122841 A1 | 5/2017 | Dudar et al. |
| 2017/0186327 A1 | 6/2017 | Uysal et al. |
| 2017/0197544 A1 | 7/2017 | Wang et al. |
| 2017/0212511 A1 | 7/2017 | Ferreira et al. |
| 2017/0227972 A1 | 8/2017 | Sabau |
| 2017/0238321 A1 | 8/2017 | Sartori et al. |
| 2017/0242095 A1 | 8/2017 | Schuh et al. |
| 2017/0242443 A1 | 8/2017 | Schuh et al. |
| 2017/0261997 A1 | 9/2017 | Switkes et al. |
| 2017/0289864 A1 | 10/2017 | Narasimha et al. |
| 2017/0293296 A1 | 10/2017 | Stenneth et al. |
| 2017/0308097 A1 | 10/2017 | Switkes et al. |
| 2017/0309187 A1 | 10/2017 | Lin |
| 2017/0329348 A1 | 11/2017 | Li et al. |
| 2017/0344023 A1 | 11/2017 | Laubinger et al. |
| 2017/0349176 A1 | 12/2017 | Alden et al. |
| 2017/0361762 A1 | 12/2017 | Wunsche et al. |
| 2018/0006365 A1 | 1/2018 | Powell |
| 2018/0018605 A1 | 1/2018 | Light-Holets et al. |
| 2018/0047293 A1 | 2/2018 | Dudar |
| 2018/0050697 A1 | 2/2018 | Kuszmaul et al. |
| 2018/0074514 A1 | 3/2018 | Switkes et al. |
| 2018/0082590 A1 | 3/2018 | MacNeille et al. |
| 2018/0082591 A1 | 3/2018 | Pandy |
| 2018/0084511 A1 | 3/2018 | Wu et al. |
| 2018/0120861 A1 | 5/2018 | Saxena et al. |
| 2018/0137763 A1 | 5/2018 | Deragården et al. |
| 2018/0143650 A1 | 5/2018 | Klaus et al. |
| 2018/0143651 A1 | 5/2018 | Klaus et al. |
| 2018/0144640 A1 | 5/2018 | Price et al. |
| 2018/0186381 A1 | 7/2018 | Erlien et al. |
| 2018/0188725 A1 | 7/2018 | Cremona et al. |
| 2018/0188744 A1 | 7/2018 | Switkes et al. |
| 2018/0188745 A1 | 7/2018 | Pilkington |
| 2018/0188746 A1 | 7/2018 | Lesher et al. |
| 2018/0190119 A1 | 7/2018 | Miller et al. |
| 2018/0190128 A1 | 7/2018 | Saigusa |
| 2018/0210457 A1 | 7/2018 | Smartt et al. |
| 2018/0210461 A1 | 7/2018 | Cremona et al. |
| 2018/0210462 A1 | 7/2018 | Switkes et al. |
| 2018/0210463 A1 | 7/2018 | Switkes et al. |
| 2018/0210464 A1 | 7/2018 | Switkes et al. |
| 2018/0211544 A1 | 7/2018 | Smartt et al. |
| 2018/0211545 A1 | 7/2018 | Smartt et al. |
| 2018/0211546 A1 | 7/2018 | Smartt et al. |
| 2018/0217610 A1 | 8/2018 | Schuh et al. |
| 2018/0245966 A1* | 8/2018 | Mittal .................. G01G 19/086 |
| 2018/0366005 A1* | 12/2018 | Seenumani ............ B61L 27/04 |
| 2019/0084533 A1* | 3/2019 | Kasper .................. B60T 7/12 |
| 2019/0179335 A1* | 6/2019 | Cha ...................... B60W 30/16 |

FOREIGN PATENT DOCUMENTS

| | | |
|---|---|---|
| EP | 1975901 B1 | 3/2009 |
| EP | 2390744 A1 | 11/2011 |
| EP | 3316064 A1 | 5/2018 |
| GB | 2540039 A | 1/2017 |
| GB | 2551248 A | 12/2017 |
| GB | 2557001 A | 6/2018 |
| GB | 2557434 A | 6/2018 |
| JP | He05-170008 A | 7/1993 |
| JP | 2995970 B2 | 12/1999 |
| JP | 2010030525 A | 2/2010 |
| JP | 2014056483 A | 3/2014 |
| JP | 2014145598 A | 8/2014 |
| JP | 2017215681 A | 12/2017 |
| WO | 2004077378 A1 | 9/2004 |
| WO | 2009024563 A1 | 2/2009 |
| WO | 2010098554 A2 | 9/2010 |
| WO | 2011125193 A1 | 10/2011 |
| WO | 2013006826 A3 | 3/2013 |
| WO | 2013147682 A1 | 10/2013 |
| WO | 2013165297 A1 | 11/2013 |
| WO | 2013187835 A1 | 12/2013 |
| WO | 2014062118 A1 | 4/2014 |
| WO | 2014092628 A1 | 6/2014 |
| WO | 2014133425 A1 | 9/2014 |
| WO | 2014137270 A1 | 9/2014 |
| WO | 2014137271 A1 | 9/2014 |
| WO | 2014145918 A9 | 12/2014 |
| WO | 2015047174 A1 | 4/2015 |
| WO | 2015047175 A1 | 4/2015 |
| WO | 2015047176 A1 | 4/2015 |
| WO | 2015047177 A1 | 4/2015 |
| WO | 2015047178 A1 | 4/2015 |
| WO | 2015047179 A1 | 4/2015 |
| WO | 2015047181 A1 | 4/2015 |
| WO | 2015047182 A1 | 4/2015 |
| WO | 2015156731 A1 | 10/2015 |
| WO | 2016065055 A1 | 4/2016 |
| WO | 2016087901 A1 | 6/2016 |
| WO | 2016134610 A1 | 9/2016 |
| WO | 2016134770 A1 | 9/2016 |
| WO | 2016135207 A1 | 9/2016 |
| WO | 2016182489 A1 | 11/2016 |
| WO | 2016201435 A1 | 12/2016 |
| WO | 2017035516 A1 | 3/2017 |
| WO | 2017048165 A1 | 3/2017 |
| WO | 2017070714 A9 | 6/2017 |
| WO | 2017148113 A1 | 9/2017 |
| WO | 2017164792 A1 | 9/2017 |
| WO | 2017179193 A1 | 10/2017 |
| WO | 2017184062 A1 | 10/2017 |
| WO | 2017184063 A1 | 10/2017 |
| WO | 2017196165 A1 | 11/2017 |
| WO | 2017200433 A1 | 11/2017 |
| WO | 2017204712 A1 | 11/2017 |
| WO | 2017209124 A1 | 12/2017 |
| WO | 2017209666 A1 | 12/2017 |
| WO | 2017210200 A1 | 12/2017 |
| WO | 2018000386 A1 | 1/2018 |
| WO | 2018035145 A1 | 2/2018 |
| WO | 2018038964 A1 | 3/2018 |
| WO | 2018039114 A1 | 3/2018 |
| WO | 2018039134 A1 | 3/2018 |
| WO | 2018043519 A1 | 3/2018 |
| WO | 2018043520 A1 | 3/2018 |
| WO | 2018043753 A1 | 3/2018 |
| WO | 2018054520 A1 | 3/2018 |
| WO | 2018085107 A1 | 5/2018 |
| WO | 2018106774 A1 | 6/2018 |
| WO | 2018111177 A1 | 6/2018 |
| WO | 2018135630 A1 | 7/2018 |

OTHER PUBLICATIONS

"Surface Vehicle Recommended Practice, J1939-71, Vehicle Application Layer" (SAE International, Warrendale, PA, Mar. 2011), 1201 pages.

Al Alam, Assad et al. "An Experimental Study on the Fuel Reduction Potential of Heavy Duty Vehicle Platooning", 2010 13th International IEEE Annual Conference on Intelligent Transportation Systems, Sep. 2010, pp. 306-311.

Al Alam, Assad et al. "Establishing Safety for Heavy Duty Vehicle Platooning: A Game Theoretical Approach", Proceedings of the 18th World Congress, The International Federation of Automatic Control (IFAC'11) Milano, Italy, Sep. 2011, pp. 3818-3823.

(56) References Cited

OTHER PUBLICATIONS

Alvarez, Luis & Horowitz, Roberto, "Safe Platooning in Automated Highway Systems Part I: Safety Regions Design", Vehicle System Dynamics, vol. 32, Jul. 1999, pp. 23-55.
Alvarez, Luis & Horowitz, Roberto, "Safe Platooning in Automated Highway Systems Part II: Velocity Tracking Controller", Vehicle System Dynamics, vol. 32, Jul. 1999, pp. 57-84.
Aoki, Keiji, "Research and development of fully automated vehicles", International Conference "Global/Local Innovations for Next Generation Automobiles" Part 1, paper OS5-1, Nov. 2013, 3 pages.
Bae, Hong S. et al., "Road Grade and Vehicle Parameter Estimation for Longitudinal Control Using GPS", 2001 IEEE Intellegent Transportaion Systems Conference Proceedings, Aug. 2001, pp. 166-171.
Bergenheim, Carl et al., "Overview of Platooning Systems", 19th ITS World Congress, Vienna, Austria, 22/26 Oct. 2012, 7 pages.
Bergenheim, Carl et al., "Vehicle-to-Vehicle Communication for a Platooning System", Procedia—Social and Behavioral Sciences, vol. 48, Jun. 2012, pp. 1222-1233.
Bevly, David et al. "Heavy Truck Cooperative Adaptive Cruise Control: Evaluation, Testing, and Stakeholder Engagement for Near Term Deployment: Phase One Final Report", Report to Federal Highway Administration (Auburn University, Auburn, AL, Apr. 2015), 135 pages;Retrieved Aug. 23, 2018 at http://atri-online.org/wp-content/uploads/2015/05/DATPPhase1FinalReport.pdf.
Bishop, Richard et al., "White Paper: Automated Driving and Platooning Issues and Opportunities", ATA Technology and Maintenance Council Future Truck Program, Automated Driving and Platooning Task Force Report (Auburn Univ., Auburn, AL, Sep. 2015), 48 pages;Retrieved Nov. 17, 2017 from http://eng.auburn.edu/~dmbevly/FHWA_AU_TRUCK_EAR/FHWA_AuburnDATP_Phase1FinalReport.
Brizzolara, Davide & Toth, Andrea, "The Emergence of Truck Platooning", Baltic Transport Journal, Mar. 2016, pp. 58-59.
Browand, Fred et al. "Fuel Saving Achieved in the Field Test of Two Tandem Trucks", California Path Research Report UCB-ITS-PRR-2004-20 (U.C. Berkeley, Berkeley, CA, Jun. 2004), 29 pages.
Desjardins, Charles et al., "Cooperative Adaptive Cruise Control: A Reinforcement Learning Approach", IEEE Transactions on Intelligent Transportation Systems, vol. 12, No. 4, Dec. 2011, pp. 1248-1260.
Erlien, Stephen M. , "Shared Vehicle Control Using Safe Driving Envelopes for Obstacle Avoidance", Ph.D Dissertation, Dept. of Mechanical Engineering (Stanford University, Stanford, CA, Mar. 2015), 182 pages.
Friedrichs, Andreas et al., "A Generic Software Architecture for a Driver Information System to Organize and Dperate Truck Platoons", International Conference on Heavy Vehicles, Paris, France, vol. 10, May 2008, pp. 250-259.
Geiger, Andreas et al., "Team AnnieWAY's Entry to the 2011 Grand Cooperative Driving Challenge", IEEE Transactions on Intelligent Transportation Systems, vol. 13, No. 3, Sep. 2012, pp. 1008-1017.
Gerdes, J. Christian & Hedrick, J. Karl, "Brake System Requirements for Platooning on an Automated Highway", Proceedings of the American Control Conference, Seattle, WA, Jun. 1995, pp. 165-169.
Gerdes, J. Christian & Hedrick, J. Karl, "Vehicle Speed and Spacing Control via Coordinated Throttle and Brake Actuation", Control Eng. Practice, vol. 5, No. 11, Sep. 1997, pp. 1607-1614.
Hallé, Simon, "Automated Highway Systems: Platoons of Vehicles Viewed as a Multiagent System", M.Sc. Dissertation, Faculte des Sciences et de Génie (Univ. Laval, Québec, Canada, Jun. 2005), 194 pages.
Hellström, Magnus, "Engine Speed Based Estimation of the indicated Engine Torque", Master's Thesis, Dept. of Electrical Engineering, Reg.# LiTH-ISY-EX-3569-2005 (Linköpings Universitet, Linköping, Sweden, Feb. 2005), 59 pages.
Holm, Erik Jonsson, "Vehicle Mass and Road Grade Estimation Using Kalman Filter", Master's Thesis, Dept. of Electrical Engineering, LiTH-ISY-EX-11/4491--SE (Linköpings Universitet, Linköping, Sweden, Aug. 2011), 50 pages.
Jacobson, Jan et al. "Functional Safety in Systems of Road Vehicles", SP Report 2010:07 (SP Technical Research Institute of Sweden, Borås, Sweden, Jul. 2010), 50 pages.
Kidambi, Narayanan et al. "Methods in Vehicle Mass and Road Grade Estimation", SAE Int. J. Passeng. Cars—Mech. Syst., vol. 7. No. 3, Apr. 2014, 2014-01-0111, 11 pages.
Kozan, Recep et al., "An Experimental Approach for Engine Mapping", Modern Applied Science, vol. 3, No. 3, Mar. 2009, pp. 3-9.
Kunze, Ralph et al. "Efficient Organization of Truck Platoons by Means of Data Mining", ICINCO 2010, Proceedings of the 7th International Conference on Informatics in Control, Automation and Robotics, vol. 1, Funchal, Madeira, Portugal, Jan. 2010, pp. 104-113.
Kunze, Ralph et al., "Organization and Operation of Electronically Coupled Truck Platoons on German Motorways", International Conference on Intelligent Robotics and Applications, Conference Proceedings ICIRA 2009, Singapore, Dec. 2009, pp. 135-146.
Larson, Jeffrey et al., "Coordinated Route Optimization for Heavy-duty Vehicle Platoons", Proceedings of the 16th International IEEE Annual Conference on Intelligent Transportation Systems (ITSC 2013), The Hague, The Netherlands, Oct. 2013, pp. 1196-1202.
Li, Shengbo Eben & Peng, Huei, "Strategies to Minimize Fuel Consumption of Passenger Cars During Car—Following Scenarios", 2011 American Control Conference, San Francisco, CA, Jun. 2011, pp. 2107-2112.
Lu, Xiao-Yun & Shladover, Steven E., "Automated Truck Platoon Control and Field Test", in Road Vehicle Automation, Lecture Notes in Mobility, G. Meyer & S. Beiker (eds) (Springer Intl. Publishing, Switzerland, Jul. 2014), pp. 247-261.
Meisen, Philipp et al. "A Data-Mining Technique for the Planning and Organization of Truck Platoons", International Conference on Heavy Vehicles, Paris, France, vol. 10, May 2008, pp. 270-279.
Michaelian, Mark & Browand, Fred, "Field Experiments Demonstrate Fuel Savings for Close-Following", California Path Research Report UCB-ITS-PRR-2000-14, (U.C. Berkeley, Berkeley, CA, Sep. 2000), 28 pages.
Micheau, Philippe & Oddo, Remy, "Revolution Speed Limiter for Engine Subjected to Large Load Variation", IFAC Advances in Automotive Control, Salerno, Italy, Apr. 2004, pp. 221-226.
Nowakowski, Christopher et al. "Cooperative Adaptive Cruise Control: Testing Drivers' Choices of Following Distances", California PATH Research Report UCB-ITS-PRR-2011-01 (U.C. Berkeley, Jan. 2011), 171 pages.
Nowakowski, Christopher et al., "Cooperative Adaptive Cruise Control (CACC) for Truck Platooning: Operational Concept Alternatives", Research Report under Cooperative Agreement No. DTFH61-13-H-00012 Task 1.2, California PATH Program, (U.C. Berkeley, Berkeley, CA, Mar. 2015), 50 pages; Retrieved Aug. 25, 2017 from http://escholarship.org/uc/item/7jf9n5wm.
Nowakowski, Christopher et al., "Heavy vehicle automation: Human factors lessons learned", Procedia Manufacturing vol. 3, Jul. 2015, pp. 2945-2952.
Packard, Andrew et al., "Section 5, Simple Cruise Control", Class notes, ME 132:Dynamic Systems and Feedback, Dept. of Mechanical Engineering (U.C. Berkeley, Spring 2005), pp. 24-52.
Paulsson, E. & Åsman, L., "Vehicle Mass and Road Grade Estimation using Recursive Least Squares", M.Sc. Thesis, Department of Automatic Control, ISRN LUTFD2/TFRT--6009--SE (Lund University, Lund, Sweden, Jun. 2016), 51 pages.
Porche, Isaac et al., "Real Time Task Manager for Communications and Control in Multicar Platoons", in Proceedings of the Intelligent Vehicles '92 Symposium, Detroit, MI, Jun. 29-Jul. 1, 1992, pp. 409-414.
Ramakers, Richard et al., "Electronically coupled truck platoons on German highways", Proceedings of the 2009 IEEE International Conference on Systems, Man, and Cybernetics, San Antonio, TX, Oct. 2009, pp. 2409-2414.
Roeth, Michael, "CR England Peloton Technology Platooning Test Nov. 2013", (North American Council on Freight Efficiency (NACFE.

(56) References Cited

OTHER PUBLICATIONS org), Fort Wayne, IN, Dec. 2013); Retrieved Aug. 23, 2018 at https://nacfe.org/wp-content/uploads/2018/02/Peloton-NACFE-Fuel-Test-Report-120213.pdf.

Sheikholeslam, Shahab & Desoer, Charles A. "Longitudinal Control of a Platoon of Vehicles; III: Nonlinear Model", UCB Path Report UCB-ITS-PRR-90-1 (U.C. Berkeley, Berkeley, CA, Apr. 1990), 25 pages.

Sheikholeslam, Shahab & Desoer, Charles A., "A System Level Study of the Longitudinal Control of a Platoon of Vehicles", Transactions of the ASME, vol. 114, Jun. 1992, pp. 286-292.

Sheikholeslam, Shahab & Desoer, Charles A., "Longitudinal Control of a Platoon of Vehicles", Proceedings of the American Control Conference, San Diego, CA, May 23-25, 1990, pp. 291-296.

Shladover, Steven E. et al. "Development and Evaluation of Selected Mobility Applications for VII: Concept of Operations", California Path Working Paper UCB-ITS-PWP-2009-3 (U.C. Berkeley, Berkeley, CA, Mar. 2009), 14 pages.

Shladover, Steven E., "Cooperative Adaptive Cruise Control: Definitions and Operating Concepts", Transportation Research Record: Journal of the Transportation Research Board, vol. 2489, Nov. 2015, pp. 145-152.

Schladover, Steven E. et al., "Demonstration of Automated Heavy-Duty Vehicles", California PATH Research Report UCB-ITS-PRR-2005-23 (U.C. Berkeley, Berkeley, CA, Jun. 2005), 459 pages.

Schladover, Steven E., "Development and Evaluation of Selected Mobility Applications for VII (a.k.a. IntelliDrive)", California Path PowerPoint Presentation (U.C. Berkeley, Berkeley, CA, Jul. 2009), 17 pages; Retrieved Jul. 21, 2017 from http://slideplayer.comislide/69815871.

Sugimachi, Toshiyuki et al. "Development of Autonomous Platooning System for Heavy-duty Trucks", Proceedings of the 7th IFAC Symposium on Advances in Automotive Control, Tokyo, Japan, IFAC Proceedings vol. 46, Issue 21, Sep. 2013, pp. 52-57.

Tsugawa, Sadayuki et al., "A Review of Truck Platooning Projects for Energy Savings", IEEE Transactions on Intelligent Vehicles, vol. 1 No. 1, Mar. 2016, pp. 68-77.

Tsugawa, Sadayuki et al., "An Automated Truck Platoon for Energy Saving", 2011 IEEE/RSJ International Conference on Intelligent Robots and Systems, San Francisco, CA, Sep. 2011, pp. 4109-4114.

Tsugawa, Sadayuki et al., "An Overview on an Automated Truck Platoon within the Energy ITS Project", Proceedings of the 7th IFAC Symposium on Advances in Automotive Control, Tokyo, Japan, IFAC Proceedings vol. 46, Issue 21, Sep. 2013, pp. 41-46.

Wille, Matthias et al., "KONVOI: Electronically coupled truck convoys", in Human Factors for Assistance and Automation, D. de Waard et al. (Eds.) (Shaker Publishing, Maastricht, the Netherlands, Jan. 2008), pp. 243-256.

Zabat, Michael et al., "The Aerodynamic Performance of Platoons: Final Report", California Path Research Report UCB-ITS-PRR-95-35 (U.C. Berkeley, Berkeley, CA, Oct. 1995), 172 pages.

Zhao, Siyang et al., "Vehicle to Vehicle Communication and Platooning for EV with Wireless Sensor Network", SICE Annual Conference 2015, Hangzhou, China, Jul. 2015, pp. 1435-1440.

\* cited by examiner

DEVICES, SYSTEMS, AND METHODS FOR VEHICLE BRAKING

BACKGROUND

Enabling a vehicle to follow closely behind one vehicle safely through partial or full automation has significant fuel savings, safety, and/or labor savings benefits, but is generally unsafe when a driver tries to do this manually. Presently, during normal driving, vehicle motion is controlled either manually, by a driver, or by convenience systems, such as cruise control or adaptive cruise control. The various types of cruise control systems control vehicle speed to make driving more pleasurable or relaxing, by partially automating the driving task. Some of these systems use range sensors and/or vehicle sensors to control the speed to maintain a constant headway relative to the lead vehicle (also referred to herein as a front vehicle). In general, these cruise control systems provide minimal added safety, and do not have full control of the vehicle (in terms of being able to fully brake or accelerate).

During rare emergencies, the acceleration and braking of a vehicle may be controlled by active safety systems. Some safety systems try to actively prevent accidents, by braking the vehicle automatically (without driver input), or assisting the driver in braking the vehicle, to avoid a collision. These systems generally add zero convenience, and are only used in emergency situations, but they may assist with braking with little or no driver input.

Driver control does not match the safety performance of even current systems, for several reasons. First, a driver cannot safely maintain a close following distance. In fact, the relatively short distances between vehicles necessary to get any measurable fuel savings results in an unsafe condition if the vehicle is under driver control, thereby risking a costly and destructive accident. Further, the driver is not as capable of maintaining a constant headway as an automated system is. In fact, a driver trying to maintain a constant headway often causes rapid and large changes in command (accelerator pedal position for example), resulting in a loss of efficiency.

It would be desirable to have reliable and economical semi-automated and/or automated vehicular convoying or platooning systems which enable vehicles to follow closely together in a safe, efficient, convenient manner.

To create a safer, more efficient, and more convenient system, it helps if a system knows various attributes of platooning vehicles. For example, if a system knows that a first vehicle has better brakes than a second vehicle, then the system may determine that the first vehicle should platoon behind the second vehicle such that if the first vehicle must brake in an emergency, the rear vehicle with better brakes will also brake—and be less likely to collide with the lead vehicle.

Thus, by knowing that a rear vehicle can stop sooner than a lead vehicle, a gap between a lead vehicle and a rear vehicle may be smaller than if nothing were known about either vehicles' brakes. And, as stated above, reducing a gap saves fuel by reducing drag on the vehicles. In addition to braking information, knowing other vehicle attributes may allow vehicles to platoon safely at closer distances. For instance, the weight of a vehicle may affect its ability to stop within a certain difference, and may be taken into consideration when determining a safe platooning distance.

Accordingly, gathering vehicle information can create safer, more efficient, and more convenient platooning systems. While some platooning systems may receive information associated with brakes, there is a need in the art for platooning systems to receive additional information, and use that information in a manner that creates better systems than those currently available.

BRIEF DESCRIPTION OF THE DRAWINGS

In order to describe the various aspects of the present disclosure, some detailed description now will be provided, by way of illustration, with reference to the accompanying drawings, in which.

DETAILED DESCRIPTION

Figure 1:
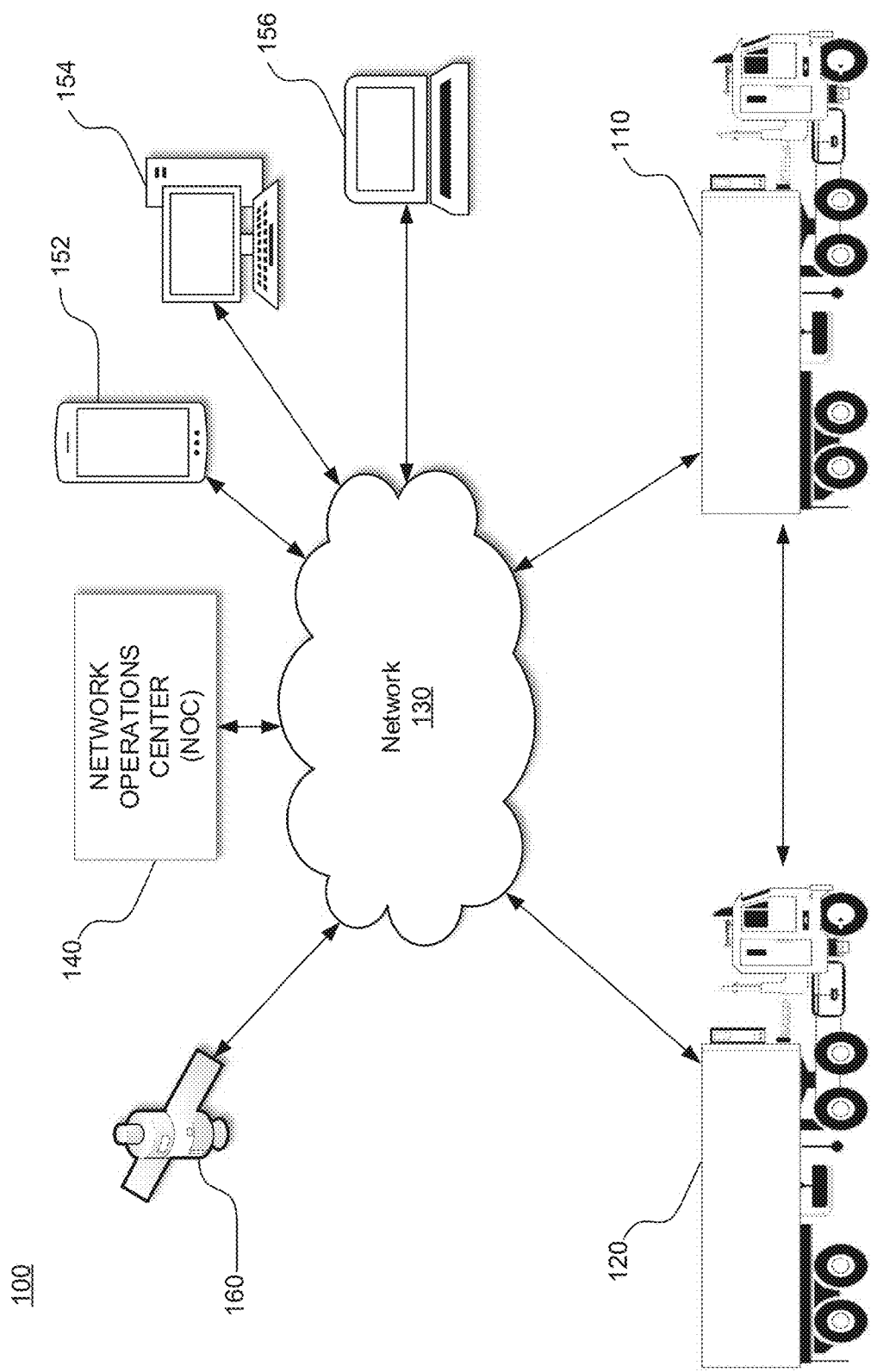
FIG. 1 illustrates a block diagram of a platooning system, in accordance with some embodiments.

The present invention will now be described in detail with reference to several embodiments thereof as illustrated in the accompanying drawings. In the following description, numerous specific details are set forth in order to provide a thorough understanding of embodiments of the present invention, including the description of a plurality of different aspects of the invention, including, in some cases, one or more alternatives. It will be apparent to those skilled in the art that the invention can be practice without implementing all of the features disclosed herein.

The Applicant has proposed various vehicle platooning systems in which a second, and potentially additional, vehicle(s) is/are automatically, or semi-automatically controlled to closely follow a lead/front vehicle in a safe manner. By way of example, U.S. application Ser. Nos. 15/605,456, 15/607,902; 13/542,622 and 13/542,627; U.S. Provisional Application Nos. 62/377,970 and 62/343,819; and PCT Application Nos. PCT/US2014/030770, PCT/US2016/049143 and PCT/US2016/060167 describe various vehicle platooning systems in which a trailing vehicle (also referred to herein as a rear vehicle) is at least partially automatically controlled to closely follow a designated lead vehicle. Each of these earlier applications is incorporated herein by reference in their entirety.

One of the goals of platooning is typically to maintain a desired position between the platooning vehicles and/or a desired relative speed (e.g., a gap my refer to a distance, a headway, or both). Thus, it should be appreciated that, herein, any reference to the term "gap" could refer to a distance, a headway, or both. Further, while the term "maintain" is used throughout this disclosure, maintaining may mean staying within a gap (distance/headway), staying at a gap, and/or keeping at least a certain gap. Further, a desired gap may include be a relative distance and/or angle/offset. A longitudinal distance is frequently referred to herein as a "target gap". That is, it is desirable for the trailing vehicle (e.g., a rear vehicle) to maintain a designated gap relative to a specific vehicle (e.g., a lead vehicle). The vehicles involved in a platoon will typically have sophisticated control systems suitable for initiating a platoon, maintaining the gap under a wide variety of different driving conditions, and gracefully dissolving (e.g., ending) the platoon as appropriate. It should be appreciated that herein, a gap may refer to a distance, a time headway, or either.

As will be discussed herein, a gap may be adjusted based on axle loads. That is to say, systems and methods will be described herein associated with determining axle loads and estimated vehicle stopping distances, and a gap size may be based on these determinations. Further, a platoon may dissolve more quickly based on an axle load that is less than optimal (e.g., a rear vehicle may increase its distance from a lead vehicle faster than it normally would based on whether an axle load), and/or a vehicle may draw-in to a platoon based on an axle load being sufficient (e.g., past a certain threshold). For example, a value representing the condition of the axle loads in the rear and/or lead vehicles is under a threshold.

In some embodiments, a gap is maintained based on data (e.g., information) received via vehicle-to-vehicle (V2V) communications that transmit information from a lead vehicle to a rear vehicle and/or vice-versa. This information may include, but not limited to: images from a camera, radar, ultrasonic, and/or LIDAR information indicating the current gap between two vehicles, lead vehicle actuator information, engine torque, brake system engagement, transmission characteristics, speed of the lead vehicle. With this information, along with a target gap, a rear vehicle can apply throttle or brakes such that the current gap is equal to the target gap.

In some embodiments, a rear vehicle may provide information to its electronic control units (ECUs) to ensure that the current gap is equal to the target gap. For example, a platoon electronic control unit (platoon ECU, PECU, or platoon system) may receive data produced at least in part by a lead vehicle's ECUs and provide that data to a rear vehicle's ECUs (e.g., one or more of a brake ECU, an engine ECU, a retarder ECU, a transmission ECU, a suspension ECU, and a chassis ECU) to control a gap better than by controlling a throttle and brake pedal. In some embodiments, a chassis ECU may control and/or monitor other ECUs such as an engine ECU, a brake ECU, etc.

As described above, to platoon in a safe and effective manner it helps to know various attributes of the platooning vehicles, such as information associated with the brakes of each vehicle. If a vehicle has good brakes, it may stop in a shorter distance than if that vehicle had poor brakes. Similarly, information related to the weight of a vehicle can help determine the distance that it takes a vehicle to stop. Sometimes, brakes may not operate deterministically. In other words, there is variation in performance from stop to stop and there are factors that reduce this variation. Knowing these factors helps to predict how the brakes will perform.

For example, a first truck may in general stop shorter than a second truck, but the second truck may occasionally stop shorter than the first truck or not stop at all. In such a case, it may be preferred to have the first truck behind the second truck, and potentially have a larger gap, because in general it may take it longer to stop than the second truck. In other words, because it is difficult to determine how long each truck takes to stop each time it stops, gathering information about stopping distances may be used to better determine which vehicle should be in the lead vs. the rear, and what a gap should be.

As a side note, the terms determine and estimate may be used interchangeably. Although they are not typically interchangeable, in the context of this disclosure various systems attempt to determine a stopping distance of a vehicle which is inherently difficult, imprecise, and non-deterministic. As such, even a determination, as used herein, may be referred to as an estimation because such a determination may be a range—regardless of how slight. Thus, unless stated otherwise, the terms determination and estimation as used by systems described herein may be interchangeable.

Returning to stopping a vehicle, on average, at 55 mph it may take a heavy vehicle with good brakes about 390 feet to stop. However, if a heavy vehicle weighs more than the average, it will take it longer than 390 feet to stop. If a vehicle weighs less than the average, it will stop at a distance that is less than 390 feet. Thus, a system can better estimate the distance it will take to stop a heavy vehicle if the weight of the vehicle is known.

Moreover, information about axle loads can be used to assist with determining the distance at which a vehicle will come to a stop. The axle load of a wheeled vehicle is the total weight felt by the roadway for all wheels connected to a given axle. This weight may also be referred to herein as the fraction of total vehicle weight resting on a given axle. This axle weight, as described above (whether the weight felt on the roadway, the axle, or the wheels (whether one, two, or more on a given axle)), may be used interchangeably with terms such as "axle load(s)", "axle weight distribution", "weight placed on one or more axles", etc. Generally, these terms refer to an amount of weight placed on one or more axles of a vehicle, which is then used to determine where a load and/or the weight of a load is concentrated in a vehicle. Thus, an axle load may be determined by sensors in a vehicle suspension system. For example, the air pressure in one or more bellows may be measured. Based on these measurements, an amount of weight on a particular axle may be determined. "Axle load" in this application can also mean load from one or more tires on an axle as opposed to the combination of all the tires on the axle.

When a vehicle is not evenly loaded the vehicle may take a longer distance to stop. A vehicle may not be evenly loaded in different ways. For example, (1) a vehicle may not be evenly loaded when the vehicle's center of mass when braking is closer to the front of the vehicle than the back of the vehicle, or vice-versa. In another example, (2) the center of mass may not be deterministic of a vehicle being unevenly loaded. One such example is when or when a center of mass is in or near the middle of a vehicle, but the load is concentrated at the extreme ends of a vehicle. In such cases, especially when there are more than two axles (e.g., when there are many pups or an axle in the center of a vehicle) a center of mass may be close to the center of a vehicle but that vehicle may still be unevenly loaded. In other words, to obtain an optimal braking distance, an axle load should be even (and in some embodiments a center of gravity should be near the center of a vehicle when braking), such that, in some embodiments, an equal amount of weight is put on each of the vehicle's axles/wheels when braking.

This effect can be seen in many vehicles. As is well known, vehicles with engines positioned at the rear or middle of the vehicle tend to brake better than vehicles with engines in the front. In wheeled vehicles, load transfer is the measurable change of load borne by different wheels during acceleration (both longitudinal and lateral). This includes braking, and deceleration (which is an acceleration at a negative rate). The major forces that accelerate a vehicle occur at the tires' contact patches. Load/weight transfer may, but not always, occur as the vehicle's center of mass shifts during automotive maneuvers. Acceleration may cause the sprung mass to rotate about a geometric axis resulting in relocation of the center of mass. By way of example, when a vehicle accelerates, a weight transfer toward the rear wheels can occur (but not always). An outside observer might witness this as the vehicle visibly leans to the back. Conversely, under braking, weight transfer toward the front of the vehicle can occur. Under hard braking it might be clearly visible even from inside the vehicle as the nose dives toward the ground (most of this will be due to load transfer). Similarly, during changes in direction (lateral acceleration), weight transfer to the outside of the direction of the turn can occur. Load transfer causes the available traction at all wheels to vary as a vehicle brakes, accelerates, or turns. This bias to some tires carrying more of the load than the others results in a net loss of total available traction. This loss in available traction causes vehicles without even axle loading when braking to stop at a longer distance than vehicles with evenly loaded axles when braking to stop (e.g., where the loss in available traction is at its lowest).

As described above, the more information a system can determine about a vehicle, the more precise the system will be able to determine how long it will take a vehicle to stop. For instance, information about a vehicle's brakes and gross weight assist with creating a zone (e.g., a bounding box) within which a vehicle is known to be able to stop (this will be discussed below with reference to at least FIGS. 7 and 8). As more information about a vehicle is included to create that bounding box, the more accurate the bounding box (e.g., the distance within which a vehicle of a certain weight may stop) may be. Thus, the determination of a bounding box will be more accurate by incorporating information associated with a vehicle's center of mass and/or axle loads.

FIG. 1 illustrates an example system 100 including two vehicles capable of platooning and associated communication links. Vehicles 110 and 120 are depicted by trucks/tractor trailers which are capable of platooning, and can communicate with each other directly or through network 130. Direct communication between two vehicles can occur wirelessly via Dedicated Short Range Communications (DSRC) (e.g., the IEEE 802.11p protocol), which is a two-way short to medium range wireless communications technology that has been developed for vehicle-to-vehicle communications. Of course, other communications protocols and channels may be used in addition to or in place of a DSRC link. For example, the inter-vehicle communications may additionally or alternatively be transmitted over a cellular communications channel such as 4G, LTE, LTE Direct, 5G, a Citizen's Band (CB) Radio channel, one or more General Mobile Radio Service (GMRS) bands, one or more Family Radio Service (FRS) bands, Wi-Fi, Zigbee and/or any other now existing or later developed communications channels using any suitable communication protocols either alone or in combination.

FIG. 1 also includes a network operations center (NOC) 140. NOC 140 may include one or more locations from which network monitoring, control, and/or management may be exercised over a communication network (e.g., the cloud/a multi-tenant environment). NOC 140 can oversee and/or control a complex network of vehicles, satellite communications, web applications, and/or management tools. Users of NOC 140 may be responsible for monitoring one or more networks, sub-networks, fleets of vehicles, and/or sub-fleets of vehicles that may require special attention to avoid degraded service. For example, NOC 140 may receive information about various vehicles 110 and 120 such as their locations and attributes, run various programs based on the received information, and send information back to vehicles 110 and 120 indicating whether they are allowed to platoon.

In addition to NOC 140, client devices 152 (e.g., a smartphone, tablet, or terminal), 154 (e.g., a desktop computer or terminal), and 156 (e.g., a laptop computer or terminal) may be used to send and/or receive information about vehicles 110 and 120, NOC 140, or information from canonical sources such as the Internet (e.g., Google Maps or another online map provider, a traffic provider, and a weather provider). Client devices can be used to view attributes of vehicles 110 and 120 such as their location, an estimate of their weight, their speed, an amount of engine torque, amount of applied break, a destination, etc.

FIG. 1 also includes a satellite 160, which can send signals to network 130, NOC 140, and/or vehicles 110 and 120. Satellite 160 may be part of a satellite navigation system such as a global navigation satellite system (GNSS). GNSSs include the United States' Global Positioning System (GPS), Russia's GLONASS, China's BeiDou Navigation Satellite System, and the European Union's Galileo. Based on information sent from satellite 160, systems described herein can determine locations of vehicles 110 and 120.

Of course, it should be appreciated that the system described in FIG. 1 is only an example, and that many other configurations may exist. For example, a NOC may assist with the monitoring and control of hundreds or thousands of vehicles, and many types of web applications may exist.

Figure 2:
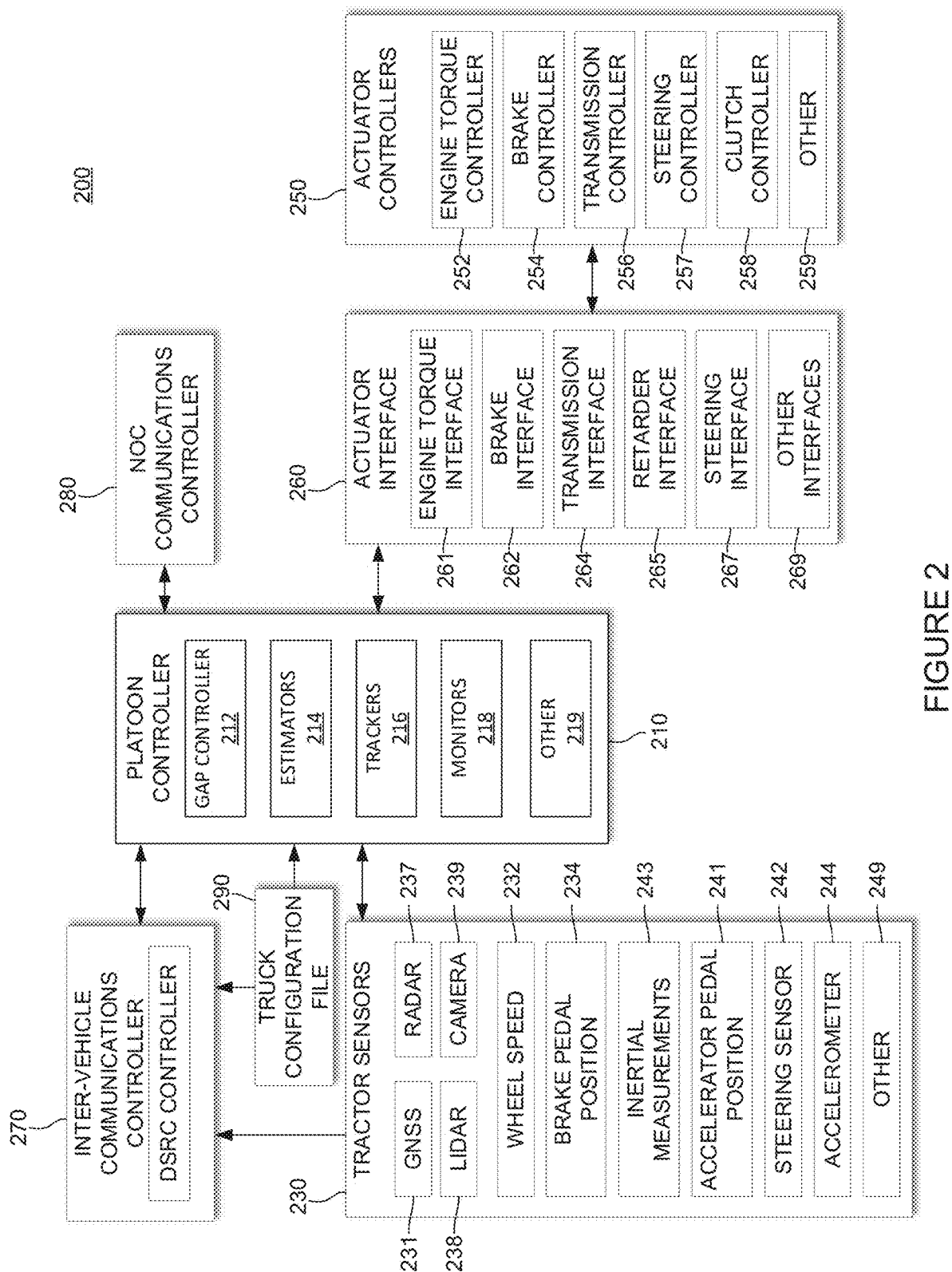
FIG. 2 illustrates an example system including a platoon controller, in accordance with some embodiments.

FIG. 2 illustrates an example system 200 including a platoon controller 210 (also referred to as a platoon electronic control unit, a platoon ECU, or a PECU). As described throughout this disclosure, a wide variety of configurations may be used to implement platooning systems described herein. The specific controller design can vary based on the level of automation contemplated for the controller, as well as the nature of and equipment available on the host vehicles participating in the platoon. FIG. 2 illustrates components of one possible configuration.

FIG. 2 diagrammatically illustrates a vehicle control architecture that can be suitable for use with platooning tractor-trailer trucks. The specific controller, or platooning ECU, illustrated is primarily designed for use in conjunction with a platooning system in which both vehicles include an active driver. The driver of the lead vehicle being fully responsible for control of the lead vehicle (although any level of automation of a lead vehicle is possible, for example, a system would work if the lead vehicle were fully or partially automated (e.g., a rear vehicle may implement adaptive cruise control). In some embodiments the driver of the rear vehicle may be responsible for steering the rear vehicle, but the platoon controller 210 may be primarily responsible for controlling the rear vehicle's torque and braking requests during active platooning. However, as discussed herein, it should be appreciated that generally similar control schemes can be used in systems which contemplate more automated control of one or both of the platooning vehicles or which utilize vehicle control commands other than or in addition to torque, throttle, and/or braking requests.

In the example embodiment illustrated in system 200, a platoon controller 210, receives inputs from a number of sensors 230 on a vehicle (e.g., a tractor and/or one or more trailers, or other connected units), and a number of actuator controllers 250 (also referred to as electronic control units or ECUs) arranged to control operation of the tractor's powertrain and other vehicle systems. An actuator interface 260 may be provided to facilitate communications between the platoon controller 210 and the actuator controllers 250. In some embodiments, one or more of the actuator interfaces 260 may be included in one or more of the actuator controllers 250 (e.g., an actuator interface may be included in an ECU). Further, in some embodiments, various interfaces and actuator controllers may be included in platoon controller 210. Platoon controller 210 may also interact with an inter-vehicle communications controller 270 (also referred to as an inter-vehicle communications ECU) which orchestrates communications with the platooning vehicles and a NOC communications controller 280 that facilitates communication with a NOC. The vehicle also preferably has selected configuration files 290 that include known information about the vehicle.

Some of the functional components of the platoon controller 210 include gap controller 212, a variety of estimators 214, one or more partner vehicle trackers 216 and various monitors 218. In many applications, the platoon controller 210 will include a variety of other components 219 as well.

Some of the sensors utilized by platoon controller 210 may include GNSS unit 231, wheel speed sensors 232, inertial measurement devices 234, radar unit 237, lidar unit 238, cameras 239, accelerator pedal position sensor 241, steering wheel position sensor 242, brake pedal position sensor 243, and various accelerometers 244. Of course, not all of these sensors will be available on all vehicles involved in a platoon and not all of these sensors are required in any particular embodiment. A variety of other sensors 249 (now existing or later developed or commercially deployed) may be additionally or alternatively be utilized by platoon controller 210 in other embodiments.

Many (but not all) of the described sensors, including wheel speed sensors 232, radar unit 237, accelerator pedal position sensor 241, steering wheel position sensor 242, brake pedal position sensor 243, and accelerometer 244 are relatively standard equipment on newer vehicles (trucks/tractors) used to pull semi-trailers. However, others, such as GNSS unit 231 and lidar unit 238 (if used) are not currently standard equipment on such vehicles or may not be present on a particular vehicle and may be installed as needed or desired to help support platooning.

FIG. 2 also illustrates various actuator controllers 250. It should be understood that, in various embodiments, some or all types of controllers may be referred to interchangeably as electronic control units (ECUs). It should, however, be understood that some ECUs may control actuators, some ECUs may control communications, some ECUs may monitor sensors, and some may perform any combination thereof. Thus, it should be appreciated that the system shown in FIG. 2 is merely one of a wide variety of systems that may be used to control platooning.

Some of the vehicle actuator controllers 250 that platoon controller 210 may direct at least in part include engine torque controller 252; brake controller 254; transmission controller 256; steering/automated steering controller 257; and clutch controller 258. Of course, not all of these actuator controllers will be available or are required in any particular embodiment and it may be desirable to interface with a variety of other vehicle actuator controllers 259 that may be available on the vehicle as well. Therefore, it should be appreciated that the specific actuator controllers 250 directed or otherwise utilized by the platoon controller on any particular controlled vehicle may vary widely. Further, the capabilities of any particular actuator controller (e.g., engine torque controller 252), as well as its interface (e.g., the nature and format of the commands, instructions, requests and messages it can handle or generate) will often vary with the make and model of that particular actuator controller. Therefore, an actuator interface 260 is preferably provided to translate requests, commands, messages and instructions from the platoon controller 210 into formats that are appropriate for the specific actuator controller hardware and software utilized on the controlled vehicle. The actuator interface 260 also provides a mechanism for communicating/translating messages, commands, instructions and requests received from the various actuator controllers back to the platoon controller 210. In some embodiments, an appropriate actuator interface may be provided to interact with each of the specific vehicle controllers utilized. In various embodiments, this may include one or more of: an engine torque interface 261; a brake interface 262; a transmission interface 264; a retarder interface 265; a steering interface 267; and/or any other appropriate controller interface 269. In some embodiments, various controllers may be combined (e.g., in the case of a chasses controller, or an engine ECU that also controls a retarder—obviating the need for a retarder ECU).

Large trucks and other heavy vehicles frequently have multiple systems for "braking" the vehicle. These include the traditional brake system assemblies mounted in the wheels of the vehicle—which are often referred to in the industry as the "foundation brakes." Most large trucks/heavy vehicles also have a mechanism referred to as a "retarder" that is used to augment the foundation brakes and serve as an alternative mechanism for slowing the vehicle or to help prevent the vehicle from accelerating down a hill. Often, the retarder will be controlled by the engine torque controller 252 and in such embodiments, the retarder can be controlled by sending appropriate torque commands (which may be negative) to engine torque controller 252. In other embodiments a separate retarder controller (not shown) may be accessible to, and therefore directed by, platoon controller 210 through an appropriate retarder interface 265. In still other embodiments, platoon controller 210 may separately determine a retarder command that it sends to actuator interface 260. In such embodiments the actuator interface may interpret the retard command and pass on appropriate retardation control commands to an engine ECU or other appropriate vehicle controller.

The communications between vehicles may be directed over any suitable channel and may be coordinated by inter-vehicle communications controller 270. As described above, the DSRC protocol may work well.

The specific information transmitted back and forth between the vehicles may vary widely based on the needs of the controllers. In various embodiments, the transmitted information may include the current commands generated by the platoon controller 210 such as requested/commanded engine torque, and/or requested/commanded braking deceleration. They may also include steering commands, transmission/gearing commands, etc. when those aspects are controlled by platoon controller 210. Corresponding information is received from the partner vehicle, regardless of whether those commands are generated by a platoon controller or other suitable controller on the partner vehicle (e.g., an adaptive cruise control system (ACC) or a collision mitigation system (CMS)), or through other or more traditional mechanisms—as for example, in response to driver inputs (e.g., accelerator pedal position, brake position, steering wheel position, etc.).

In many embodiments, much or all of the vehicle sensor information provided to platoon controller 210 is also transmitted to another vehicle in a platoon and corresponding information is received from the other vehicle in the platoon so the platoon controllers 210 on each vehicle can develop an accurate model of what the other vehicles are doing. The same is true for any other relevant information that is provided to platoon controller 210, including any vehicle configuration information 290 that is relevant to platoon controller 210. It should be appreciated that the specific information transmitted may vary widely based on the requirements of platoon controllers 210, the sensors and actuators available on the respective vehicles, and the specific information that each vehicle may have about itself.

The information transmitted between vehicles may also include information/data about intended future actions as will be discussed in greater detail below. For example, if the lead vehicle knows it is approaching a hill, it may expect to increase its torque request (or decrease its torque request in the context of a downhill) in the near future and that information can be conveyed to a rear vehicle for use as appropriate by the platoon controller 210. Of course, there is a wide variety of other information that can be used to foresee future torque or braking requests and that information can be conveyed in a variety of different forms. In some embodiments, the nature of the expected events themselves can be indicated (e.g., a hill, curve, or exit is approaching) together with the expected timing of such events. In other embodiments, the intended future actions can be reported in the context of expected control commands such as the expected torques and/or other control parameters and the timing at which such changes are expected. Of course, there are a wide variety of different types of expected events that may be relevant to the platoon control.

The communications between the vehicles and the NOC may be transmitted over a variety of different networks, such as a cellular network, various Wi-Fi networks, satellite communications networks and/or any of a variety of other networks as appropriate. The communications with the NOC may be coordinated by NOC communications controller 280. The information transmitted to and/or received from the NOC may vary widely based on the overall system design. In some circumstances, the NOC may provide specific control parameters such as a target gap (e.g., a target distance between two vehicles). These control parameters or constraints may be based on factors known at the NOC such as speed limits, the nature of the road/terrain (e.g., hilly vs. flat, winding vs. straight, etc.) weather conditions, traffic or road conditions, etc. In other circumstances the NOC may provide information such information to platoon controller 210. The NOC may also provide information about the partner vehicle including its configuration information and any known relevant information about its current operational state such as weight, trailer length, etc.

Lastly, with regard to FIG. 2, configuration file 290 may include a wide variety of information about the host vehicle that may be considered relevant to controller 210. By way of example, some of the information might include the vehicle's specification including such things as engine performance characteristics, available sensors, the nature of its braking system, the location of its GNSS antenna relative to the front of the cab, gear ratios, differential ratios etc.

Figure 3:
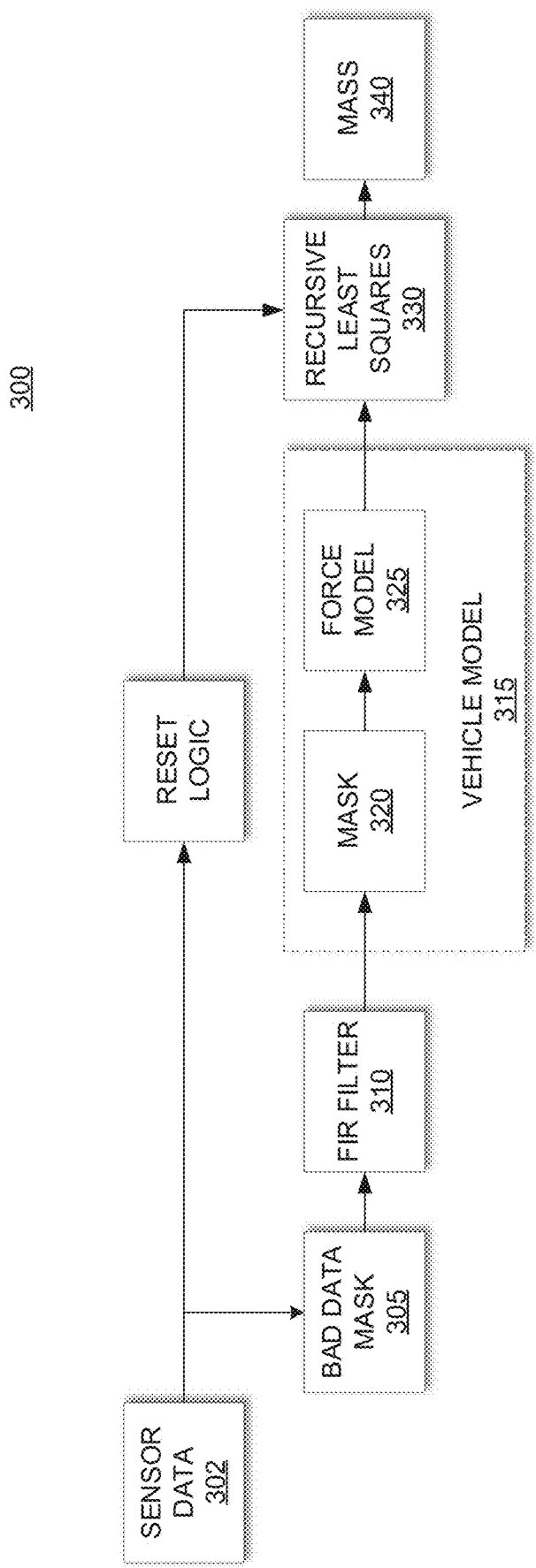
FIG. 3 illustrates a method for assessing vehicle mass, in accordance with some embodiments.

FIG. 3 illustrates a method 300 for assessing vehicle mass while the vehicle is moving, particularly appropriate to long-haul trucks but also applicable to vehicles generally. U.S. application Ser. Nos. 15/908,677, 15/988,905, and PCT Application No. PCT/US2017/047771 describe various mass estimation systems and are incorporated herein by reference in their entirety. Mass estimation fundamentally involves Newton's second law, Force=mass*acceleration, with an averaging over time to obtain a more accurate real-world picture.

Sensor data 302 can provide input for estimating mass, and may include, but is not limited to: GPS data, wheel speed data, wheel size data, transmission information such as what gear ratio a vehicle is using, information from an engine ECU (e.g., torque, friction, speed), information from a brake ECU (e.g., whether braking is applied, an amount of brake pressure), and information from a chassis ECU.

The process can mask out bad data, shown as 305, such as slow speed data (e.g., less than 4 m/s (about 9 mph)) where air resistance and other parameters are too small to result in accurate modeling (at low speeds, engine and transmission dynamics may have a larger effect and can add noise into force modelling), data resulting from large bumps in the road can also be masked out, and can be detected by an unexpected vertical acceleration above a predetermined threshold. The data can then be filtered through a finite impulse response filter 310 which can remove phase lag with a well-defined "wind up" time. Other filter types can be used in at least some embodiments. The filtered data can then be passed through another mask 320 and force model 325 specific to the vehicle operation, as shown at 315. The vehicle model mask 320 and force model 325 are intended to reject data that would lead to unreliable estimates, and includes braking (often trailer brakes may "stick" and stay on for a non-deterministic amount of time, which may be accounted for), both during and five seconds after since brake forces are complicated to model, non-steady-state engine torque, e.g., 2000 Nm/s, both during and 0.5 seconds after, because engine reported torque is not accurate during transients, and when gear is gear 6 or below when accelerating or gear 11 or below when retarding, since engine/powertrain efficiency varies at lower gears. The output of the vehicle model can then be filtered through a recursive least squares filter, or similar, as shown at 330. The result is an indication of vehicle mass 340. The process can be reset when the vehicle is either stopped for a threshold period or turned off or the parking brake is pulled (this may be a proxy for detecting when a trailer is swapped, and thus the mass of a vehicle may be changed, which should be accounted for), or the mapping data indicates arrival at a destination. Alternatively, a second recursive least squares calculation can be performed in parallel with the first, and both can be restarted if results vary by more than a threshold amount, e.g., 15%.

Figure 4:
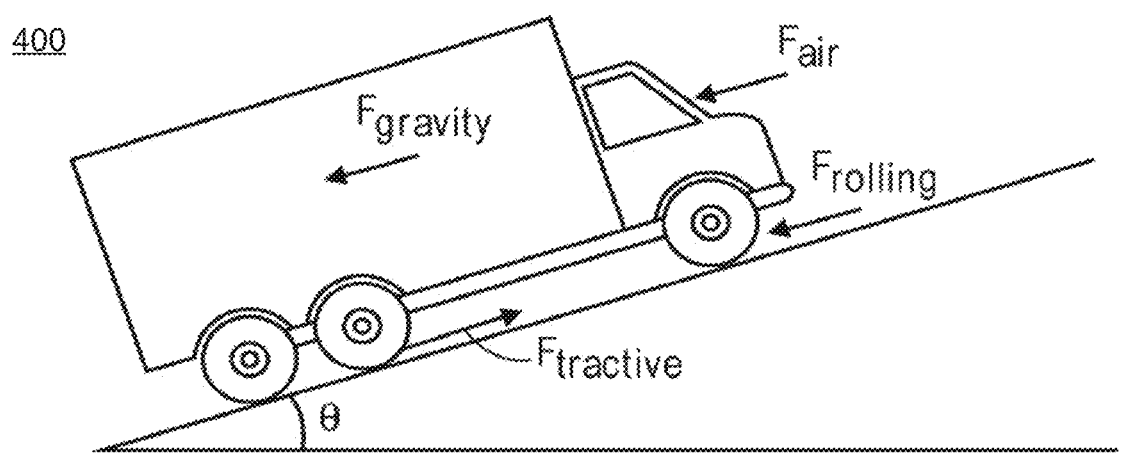
FIG. 4 illustrates a diagram of how mass estimation can be modeled, in accordance with some embodiments.

FIG. 4 is a diagram 400 showing how mass estimation of a vehicle can be modeled. In this example, the forces acting on a vehicle while in motion are measured or modeled, such as rolling resistance ($F_{rolling}$), air resistance ($F_{air}$), the forces of gravity ($F_{gravity}$), particularly if the vehicle is travelling either up or down hill, and any tractive forces ($F_{tractive}$) created by the vehicle pulling a trailer or other load. In addition, the acceleration of the vehicle can be measured or modeled. After all of the known forces can be measured or modeled, and the acceleration can be modeled/determined, mass is calculated using algorithms based on Newton's second law as described above.

Figure 5:
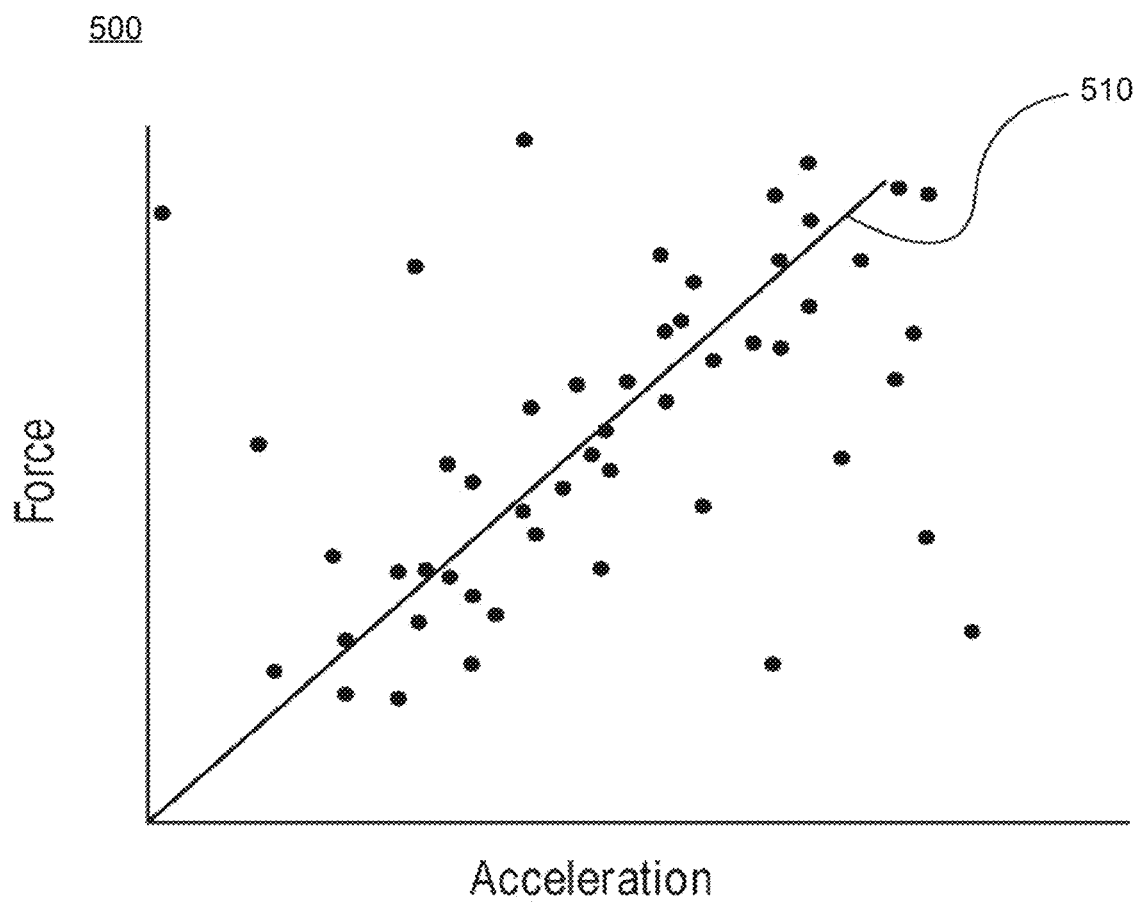
FIG. 5 illustrates a diagram of how multiple mass estimation sample points are plotted over time, in accordance with some embodiments.

FIG. 5 is a diagram 500 illustrating how multiple mass estimation sample points are plotted over time to arrive at an accurate mass estimation for a vehicle. For example, a mass estimation calculation may be performed at fixed intervals of every 100 ms while a vehicle is operating. As the different mass estimations data points are collected, they are plotted based on Force vs. Acceleration. After a sufficient number of samples, the data points typically converge, as represented by the line 510 in the plot. Once this convergence takes place, a highly accurate estimation is realized, typically within five percent (5%) of the true mass of the vehicle.

The averaging of the mass estimation tends to result in a more accurate mass estimation in the presence of disturbances. For instance, a large tractor trailer may carry experience wind, bumps in the road, etc. By averaging mass over the duration of a trip, disturbances may be recognized/accounted for.

Estimating mass is particularly important for proper ordering of platooning vehicles, since lighter vehicles brake, accelerate and climb grades more easily. Knowing how each vehicle will perform is relevant to maintaining a gap, as well. At the same time, it can be desirable in some instances, such as rolling hills, to allow variations in a gap to accommodate the need for braking. In this regard, there are multiple ways to slow down a vehicle such as a long-haul truck. Among these are engine positive torque, engine braking (e.g., to cut fuel to an engine and let engine friction slow down a truck), retarder (e.g., to run an engine as a pump to slow down), and foundation brakes (e.g., applying pressure to brake pads to generate heat and slow a vehicle down). It is not desirable to use foundation brakes unless necessary because they are more expensive to service than the other actuators, their use causes reduced fuel economy, excessive use can cause brake fade and risk inability to stop (e.g., on steep grades, foundation brake use should be limited), and their use is less comfortable for a driver than engine braking or using a retarder. In addition, separating out the brake use to hold a shorter gap makes it more explicit when the platooning system transitions to brakes and ensures the retarder is used fully before engaging the brakes. This is especially true on rolling hills where the grade is changing rapidly.

Figure 6:
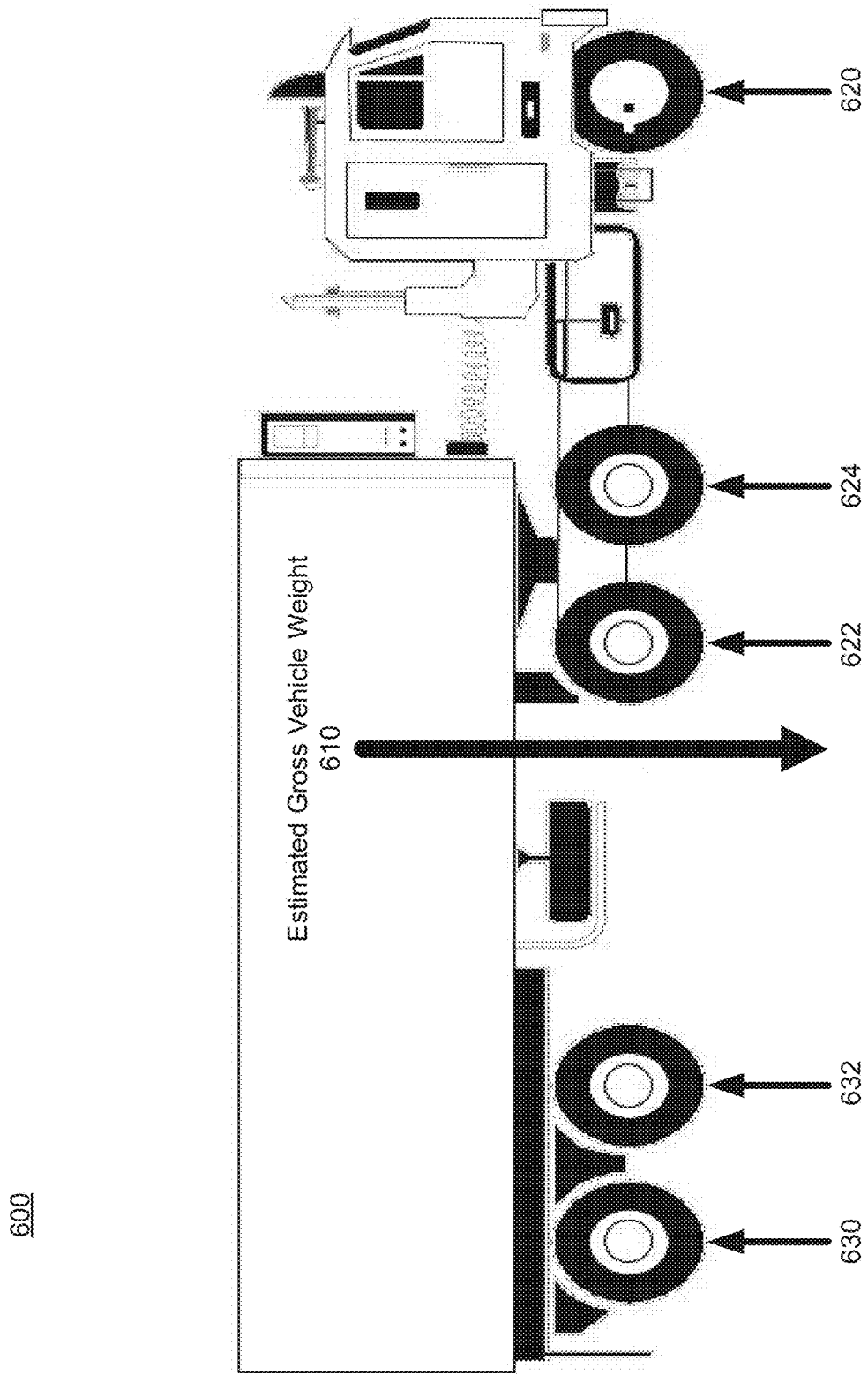
FIG. 6 illustrates a diagram of vehicle and axle loads, in accordance with some embodiments.

FIG. 6 illustrates a diagram 600 of vehicle and axle loads, in accordance with some embodiments. An estimated gross vehicle weight 610 is also shown. In various embodiments, an empty vehicle may be about 35,000 lbs., and a full vehicle can be close to 80,000 lbs. Additionally, in some jurisdictions, steer axle 620 may have an axle load of 12,000 lbs., drive axles 622 and 624 may have an axle load of 34,000 lbs., and trailer axles 630 and 632 may have an axle load of 34,000 lbs. In some embodiments, trailer axles 630 and 632 may be moved/slid to change the amount of weight on both the trailer axles 630 and 632 and the drive axles 622 and 624. For example, if trailer axles 630 and 632 are slid toward the rear the trailer axles 630 and 632 would have less weight on them and drive axles 622 and 624 would have more weight on them. Similarly, the point at which a fifth wheel connects to a tractor may be moved/slid. Adjusting the fifth wheel may come into play when the axle load on trailer axles 630 and 632 are barely legal, and the axle load on drive axles 622 and 624 is more than an allowed limit. By moving the fifth wheel weight may be shifted from the drive axles 622 and 624 to the steer axle 620. Thus, it should be appreciated that in various embodiments herein, a system may provide a notification to a user, slide trailer axles, and/or adjust a fifth wheel to cause a better axle load (e.g., the amount of weight on one or more axles) such that the vehicle may weigh an amount that is legal, and/or a vehicle may be loaded better such that it stops sooner when braking.

There are a variety of methods to measure axle loads. For example, a scale (e.g., a Certified Automated Truck SCALE) may measure each individual axle or set of axles. Unfortunately, locations where vehicles are loaded often do not have scales, so drivers are forced to travel to the nearest scale to determine axle loads.

However, in some embodiments sensors located on a vehicle may be used to measure axle loads.

As one example, a system may include a suspension system which may include a suspension control processor (e.g., a suspension ECU) and/or a load sensor arranged at each of the axles for detecting one or more axle loads. Load sensors may transmit information through wires or wirelessly to a suspension ECU through a network or directly. Such load sensors may determine axle loads based on an amount of air within air bellows (also known as air bags).

Similarly, strain gauges may be used to determine axle loads. Strain gauges are sensors which are used in variety of physical measurements. They change resistance when they are stretched or compressed. Because of this property, strain gauges often are bonded to a solid surface and used for measuring acceleration, pressure, tension, and/or force.

In some embodiments, strain gauges may be attached to portions of a suspension system (e.g., as a wheatstone bridge). These strain gauges may measure suspension by being mounted to steel, aluminum, titanium, rubber, or carbon fiber associated with a suspension system.

In various embodiments, the weight applied to a tire may be determined based on a measurement. Such a measurement may be tire/air pressure, which can be measured by a variety of instruments (and results may be transmitted wirelessly, as with other sensors described herein).

In some embodiments, a strain gauge may measure deflection. In such an embodiment, a strain gauge may be bonded to the inside of a tire, and as weight is placed on that tire the interior of the tire may deflect (e.g., expand) and the stain gauge may produce data associated with the deflection. This data can then be transmitted to a system (e.g., a strain gauge ECU, tire ECU, suspension ECU, axle ECU) and be used to determine a load on a particular axle.

Based on information gathered about various axle loads, (e.g., information gathered from a suspension air bag/bellow, information gathered from a strain gauge), a center of mass can be estimated. In response to a center of mass being estimated, a system may better determine how long (e.g., distance and/or time) that it will take for a vehicle to stop.

Figure 7:
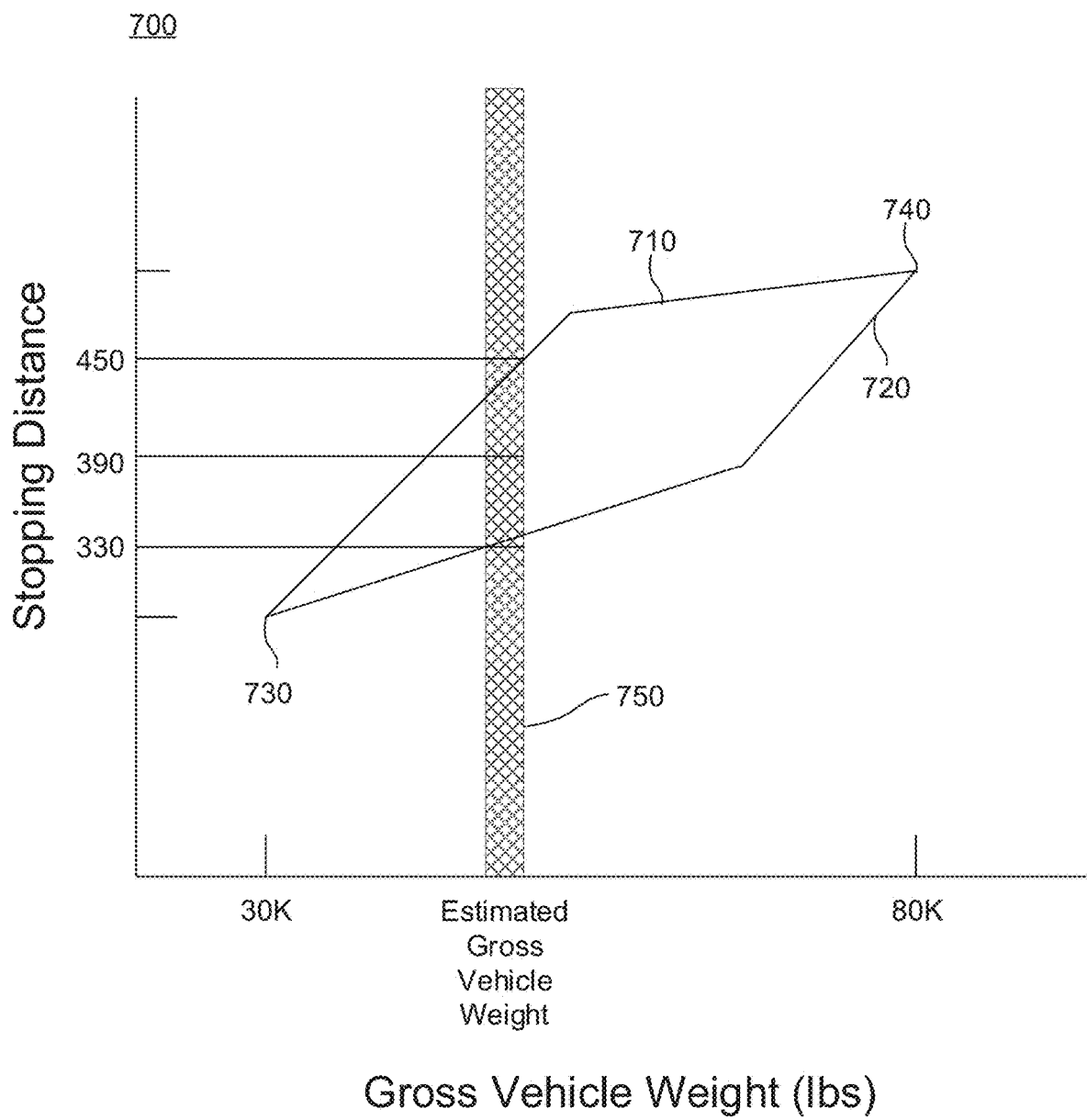
FIG. 7 illustrates a graph that shows stopping distance compared to gross vehicle weight, in accordance with some embodiments.

FIG. 7 illustrates a graph that shows stopping distance compared to gross vehicle weight. Lines 710 and 720 represent two vehicles, which may stop at different distances based their vehicle weight. At point 730 the two vehicles weigh the same amount (30K lbs.), and as such they fall within the same band of likely stopping distance, though their actual stopping distance may depend on other factors that impact their stopping distance. Similarly, at point 740 the two vehicles weigh the same amount (80K lbs.), and as such they likely stop at the same distance.

However, when the two vehicles each weigh an amount estimated to be in band 750 (e.g., a weight bound by band 750), a first vehicle may stop at about 450 ft. and a second vehicle may stop at about 330 ft. Generally, the difference in this stopping distance is based on a variety of vehicle attributes (in addition to or in concert with an estimated gross vehicle weight).

Thus, the more vehicle attributes known to a system in addition to gross vehicle weight, the more accurate the system will be at estimating a stopping distance.

Figure 8:
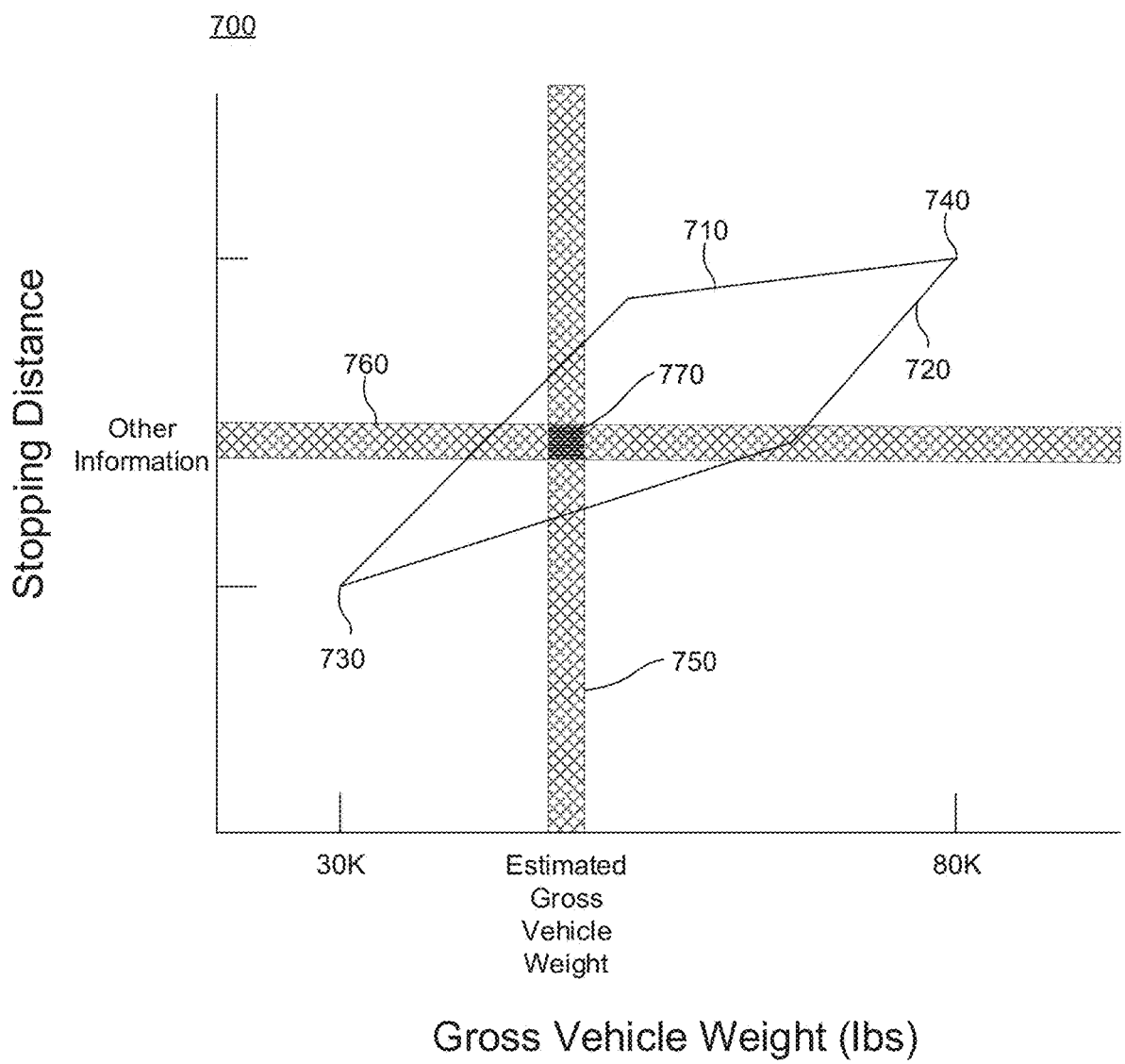
FIG. 8 illustrates a graph that shows stopping distance compared to gross vehicle weight, in accordance with some embodiments.

FIG. 8 also illustrates graph 700 that shows stopping distance compared to gross vehicle weight. Unlike FIG. 7, FIG. 8 includes a band 760 indicating other information affecting a stopping distance. In other words, other vehicle information limiting or increasing the stopping distance is indicated by band 760. By combining information known about a gross vehicle weight and other information about a vehicle affecting its stopping distance (e.g., fleet loading policies, knowing/receiving information indicating that a rear trailer may not be heavier than a front trailer, knowing/receiving information about a bill of lading, knowing/receiving information about sensors on cargo contents), a bounding box 770 may be determined which indicates an area in which a vehicle will stop (e.g., 760) provided it weighs a particular amount (e.g., 750). In fact, bounding box 770 may be smaller based on each piece of information a system knows that affects the stopping distance of a vehicle. Of course, it should be appreciated by one of skill in the art that one or more of bands 750 and 760 may not comprise parallel lines, and/or that bounding box 770 may not be a square or rectangle as depicted in FIG. 8. For example, horizontal band 760 may be wider or narrower based on a vehicle's weight.

In various embodiments, the other information may be an axle load as described above. Based on an axle load, a system can determine whether a vehicle will stop earlier or later than another vehicle, when everything else is equal. Thus, in this example, an estimated gross vehicle weight can be used to determine vertical band 750 while an axle load can be used to determine horizontal band 760. Based on these two estimations, bounding box 770 can be determined, and based on bounding box 770, a more precise determination regarding how long it takes to stop a vehicle may be made as opposed to a determination solely based upon a gross vehicle weight.

Since platooning requires a rear vehicle to stop before it collides with a lead vehicle, the rear vehicle will typically have the ability to stop at least within a same distance as a lead vehicle, or at least no worse than a buffer distance between the vehicles. As such, when a platooning system (e.g., a platooning controller, NOC) determines what order vehicles should be in when platooning, it may base its decision on each vehicle's estimated stopping distance which may be based on each vehicle's gross weight and/or other information including each vehicle's axle loads.

It should be appreciated that the example methods and systems described herein do not require a determination and/or estimation of the axle load of each and every axle to create a bounding box 770 (e.g., estimate a stopping distance within two distances). In other words, bounding box 770 may be created in response to determining axle loads for a steer axle, one or more drive axles, one or more trailer axles, or any combination thereof. This is because, as mentioned above, any information associated with stopping ability may be used to create band 760 (e.g., band 760 may be based on any information associated with a stopping distance). For example, only knowing the axle load of the tractor axles (e.g., a steer axle and a drive axle) would increase the accuracy of an estimated stopping distance (e.g., the thickness of band 760), even if trailer axle loads are not known. Of course, a system that can determine the load on every axle would be more precise, however any information associated with stopping would assist with estimating/determining a stopping distance.

In some embodiments, a bounding box/stopping distance may be affected by additional constraints. For example, legal constraints may assist with estimating how long it will take for a vehicle to stop (e.g., how big bounding box 770 is). Legal constraints may include, but are not limited to: gross vehicle weight (e.g., 80,000 lbs.), weight limits per axle/tandem axle (e.g., steer axle—12,000 lbs., drive axles—34,000 lbs., and trailer axles—34,000 lbs.), seasonal load limitations, and/or a difference in weights between axles.

As another example, a type of load may affect a bounding box/stopping distance. In some embodiments, a vehicle may be hauling bulk cargo, such as a liquid, which may be evenly spread out within a trailer.

Figure 9:
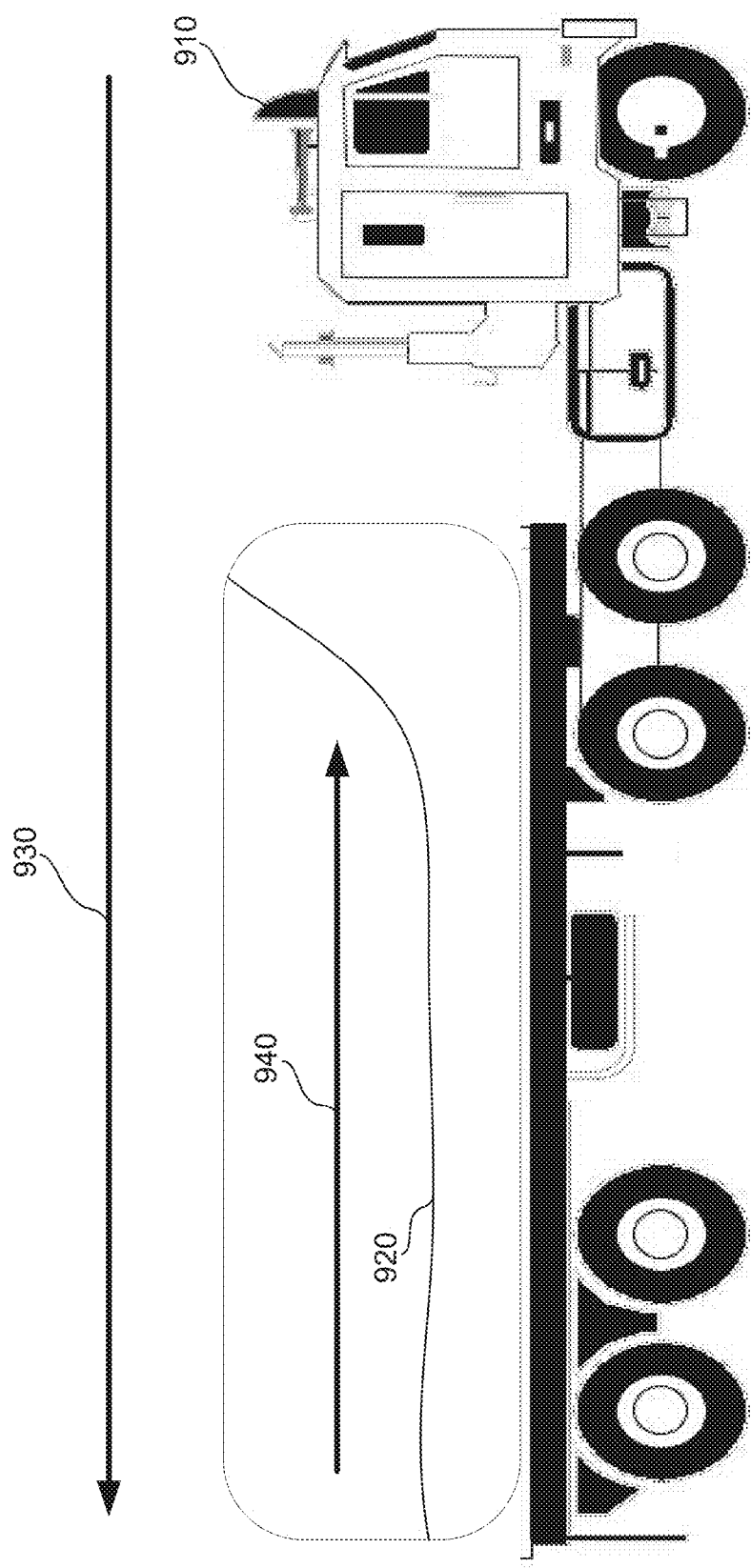
FIG. 9 illustrates a vehicle including a trailer for hauling a liquid, in accordance with some embodiments.

For example, FIG. 9 illustrates a diagram of a vehicle 910 hauling a trailer containing a liquid 920. A trailer may be carrying gasoline, oil, milk, etc. In such a case, a stopping distance may be estimated based on the effect of a liquid 920 moving toward the front 940 of a vehicle in a braking situation. As shown in FIG. 9, as a force 930 (e.g., braking) occurs, liquid 920 is pushed toward the front of its container 940. Of course, a stopping distance estimation may change based on an amount of liquid 920 in a trailer. For example, if a trailer meant to hold a liquid 920 is completely full, the amount of liquid 920 that moves to the front of a trailer during a braking event may be low. Similarly, if a trailer meant to hold a liquid 920 is completely empty, the amount of liquid 920 that moves to the front of a trailer 940 during a braking event may be low. However, if a trailer meant to hold liquid 920 is half full, for instance, then the amount of liquid that moves to the front of a trailer during a braking event may be high. In other words, the loads on the axles of a tractor-trailer while braking may be based on an amount of liquid in a trailer.

As with other vehicle attributes described herein that may affect a vehicle's stopping distance, a system may perform various operations based on the vehicle's attributes. For example, the amount of liquid 920 in a trailer may be transmitted to a NOC, and based on that amount of liquid 920 the NOC may determine a bounding box/estimated stopping distance of a vehicle, and based on that bounding box the NOC may determine an order of vehicles in a platoon and/or whether the vehicle may platoon at all.

Figure 10:
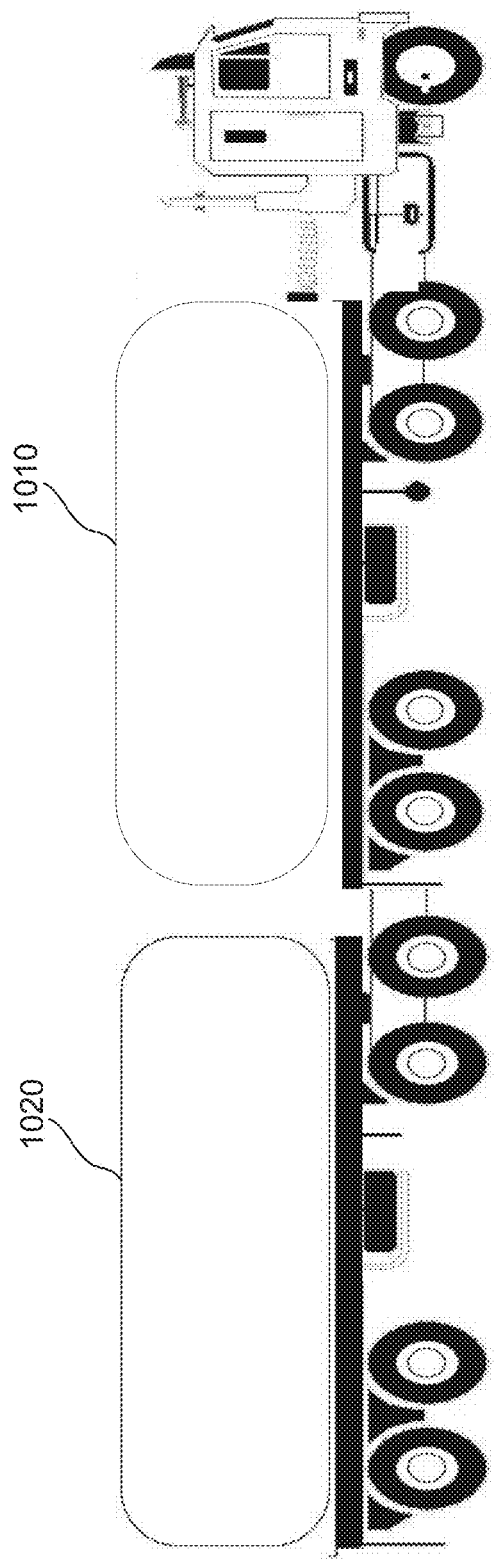
FIG. 10 illustrates a vehicle including multiple trailers, in accordance with some embodiments.

Of course, not all trailers are the same. For example, as shown in FIG. 10, some vehicles may have more than one trailer 1010 and 1020 carrying a liquid. Some vehicles may have liquid-carrying trailers with baffles, which may prevent at least some shifting of weight due to liquid moving forward during a braking event. Some vehicles may have more than one trailer 1010 and 1020 with unknown weights, axle loads, centers of gravities, etc. Although, in some embodiments a system may assume/estimate that a front trailer (e.g., a trailer in between a tractor and one or more additional trailers) is loaded such that it is heavier than a rear trailer.

Figure 11:
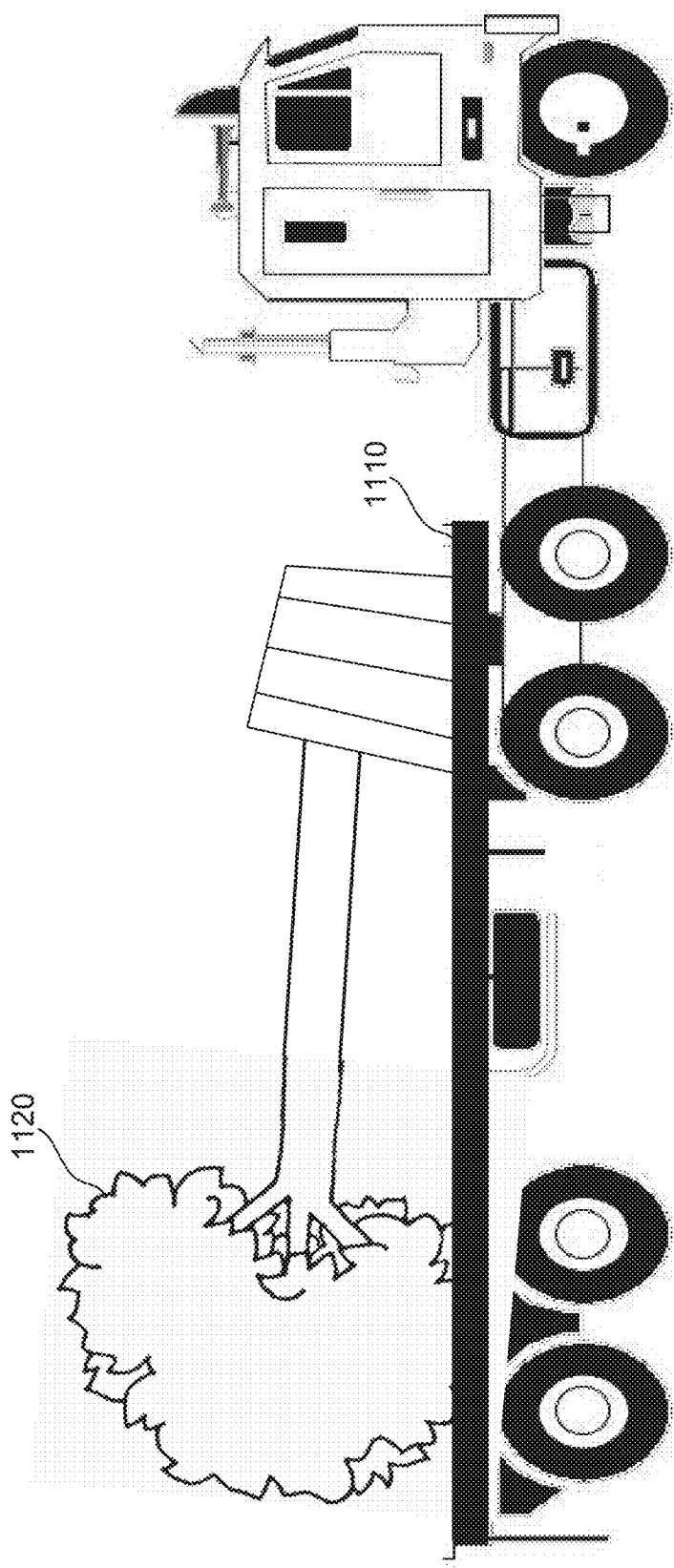
FIG. 11 illustrates a vehicle including a flatbed trailer, in accordance with some embodiments.

Some vehicles may have trailers with loads that are not completely enclosed. For example, as shown in FIG. 11, a trailer 1110 may be a flatbed with a tree 1120 laying horizontally on it. A trailer 1110 may be a flatbed with blocks, tubes, and/or other building materials on it. A trailer 1110 may transport vehicles, mobile homes, and/or an oversize load. Some trailers 1110 may transport fruit and/or vegetables and have semi-transparent walls. Further, some trailers 1110 may transport animals such as horses. Regardless of whether a trailer 1110 covers its loads, some or all of the methods and systems described herein may operate as described above. However, it is contemplated that in some embodiments a trailer 1110 carrying a load that is visible (e.g., because a trailer does not have opaque walls) may assist a system with estimating/determining additional constraints for a bounding box 770. For example, a system may include an electronic/web application where a user may take a picture of a load and/or provide a description of goods (e.g., what type of goods, how they are loaded), and that information may be used by a system to assist with determining a stopping distance, whether a vehicle can platoon, an order of platooning vehicles, and/or a gap between platooning vehicles.

Figure 12:
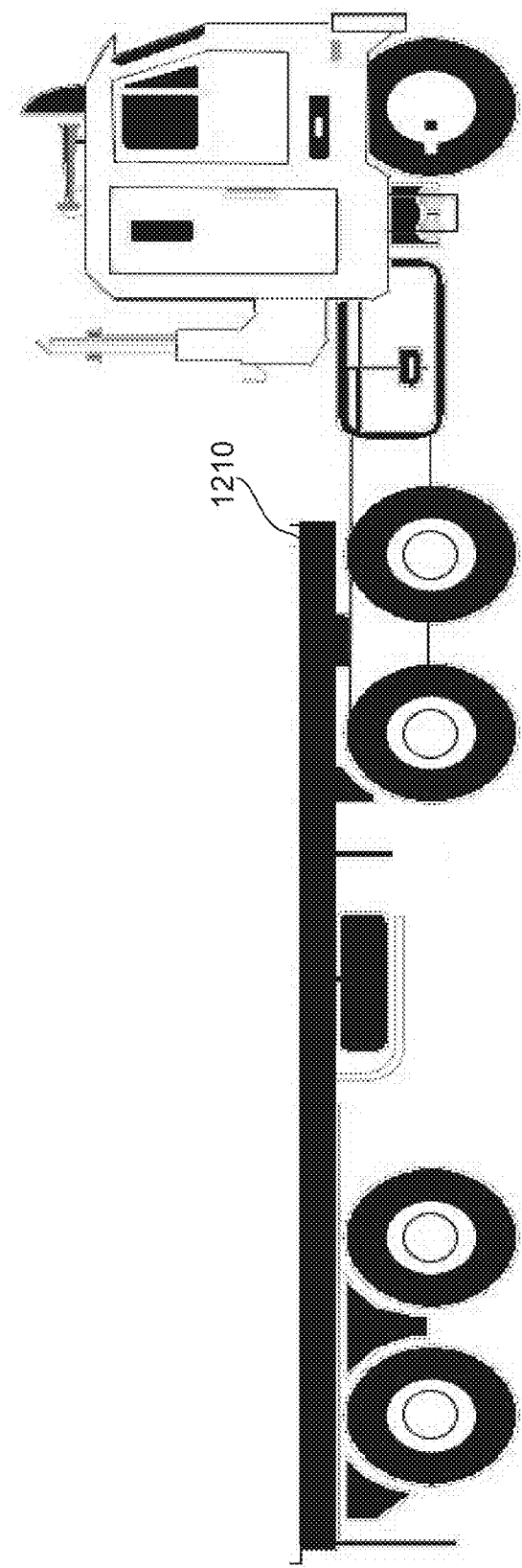
FIG. 12 illustrates a vehicle including an empty trailer, in accordance with some embodiments.

In other embodiments, such as that shown in FIG. 12, a stopping distance/bounding box 770 may be estimated by the absence of goods within/on a trailer 1210. For instance, knowing a tare and/or kerb weight of a vehicle may be used by a system to estimate a stopping distance. Further, it is contemplated that a stopping distance may be estimated by known attributes of a tractor when the tractor is bobtailing.

As described above, a variety of operations may be performed based at least in part on estimating/determining axle loads. For example, a gap between one or more vehicles may be determined (e.g., a minimum gap, a maximum gap) based on axle loads. As another example, platooning may be disallowed based on axle loads. In some embodiments, platooning may be disallowed based on axle loads in combination with external attributes such as a particular location/stretch of road (which may be geofenced), and/or weather conditions (e.g., icy roads, bridges, rain, rain combined with tire tread). As another example, functions such as automated cruise control, advanced driving assistance systems (ADAS), predictive cruise control, and/or other vehicle functions may be disabled or enabled based on axle loads. In some embodiments, it is contemplated that a speed of a vehicle may be governed based on axle loads. For example, a vehicle may be limited to traveling at 55 miles per hour if its load is not balanced well. Of course, this too can be combined with other factors such as weather conditions.

In some embodiments, it may be possible to determine gross vehicle weight and/or axle loads in situations other than when a vehicle is stationary. For example, axle loads could be determined during acceleration. For example, an axle load may be calculated if a vehicle is moving at a known acceleration and/or speed, and sensors are able to measure an amount of weight placed on each axle during acceleration.

In some cases, a system may determine that an axle is overloaded when a wheel speed sensor in a system determines that braking events cause a wheel to brake at a low speed during harder braking events (e.g., one wheel brakes at a different speed than other wheels). In some embodiments, automatic braking systems (ABS) parameters may be adjusted based on information associated with axle loads. For instance, a system may determine that one axle is more stressed than others and didn't receive an expected amount of torque. In such a case, a notification may be sent to a system indicating that an axle is not operating in its normal state. By determining axle health in this manner, a system may determine that one or more axles are overloaded and not performing as well as expected—without needing to brake hard to make the determination.

Further still, in some embodiments, path planning may be determined based on axle loads. For example, if a system on a vehicle determined that it would stop at a certain distance due to poor axle loading, it may take different actions than if it were loaded well. For example, a determination of a stopping distance based on axle loading may cause a vehicle to avoid a collision by swerving/turning rather than braking hard because a system may have determined that braking hard would not prevent a collision—when braking hard would normally prevent a collision if the vehicle were loaded differently.

Figure 13:
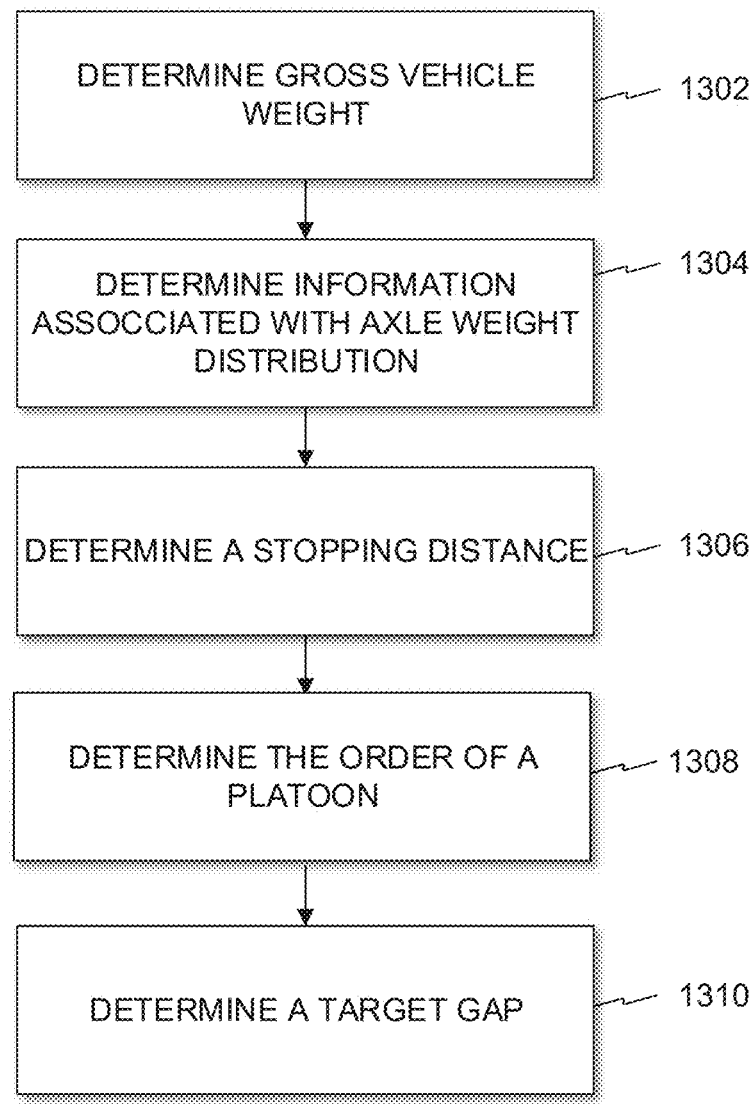
FIG. 13 illustrates a flow chart of an example process, in accordance with some embodiments.

FIG. 13 shows a flowchart 1300 of a method for maintaining a relationship between a plurality of vehicles, in accordance with one or more embodiments of the invention. While the various steps in the flowchart are presented and described sequentially, one of ordinary skill will appreciate that some or all of the steps can be executed in different orders and some or all of the steps can be executed in parallel. Further, in one or more embodiments of the invention, one or more of the steps can be omitted, repeated, and/or performed in a different order. Accordingly, the specific arrangement of steps shown in FIG. 13 should not be construed as limiting the scope of the invention. In one or more embodiments, the steps of FIG. 13 can be performed by example systems 100 and/or 200.

In step 1302, a gross vehicle weight is determined. A gross vehicle weight can be determined (e.g., estimated—as previously discussed) using various methods, including, but not limited to: weighing a vehicle on a scale; adding a known amount of weight to a vehicle with a known weight; determining axle loads; and determining amounts of weight placed on one or more axles as a vehicle is accelerating/braking.

In step 1304, information associated with axle weight distribution is determined. As discussed above, an axle weight may be determined by sensors in a vehicle suspension system. For example, the air pressure in one or more bellows may be measured. Based on these measurements, an amount of weight on a particular axle may be determined.

In some embodiments, a system may only be able to determine axle loads for a steer axle and a drive axle, while not being able to determine an axle load for one or more trailer axles (e.g., axles supporting one or more trailers). In such an embodiment, a system may be able to determine the axle load of the trailer axles by subtracting the axle loads on the steer axle and drive axles from the weight of the vehicle. E.g., $$\text{Gross Vehicle Weight} - \text{Steer Axle Load} - \text{Drive Axle Load} = \text{Trailer Axle Load} \quad \text{(Equation 1)}$$

In some embodiments, axle loads may be determined using strain gauges located on and/or inside portions of a suspension (e.g., bellows), one or more tires, etc. It is further contemplated that one or more devices may receive data wirelessly from sensors located on a suspension, wheel, bellow, or another portion of a vehicle which may be used to determine axle loads. Such sensor information may be sent to a platooning ECU, a base station, or to a central server/set of servers/cloud (e.g., a NOC).

In step 1306, a stopping distance is determined. Based on an estimated/determined gross vehicle weight, an area in which a vehicle should/will stop at a certain speed may be determined. As shown in FIGS. 7 and 8, this estimation may be illustrated by a (bounding) band (e.g., band 750). In response to additional data which may assist with determining a distance in which a vehicle may stop (e.g., brake health, axle load), a system may be able to estimate a stopping distance more precisely. This preciseness may be illustrated by (bounding) band 760 of FIG. 8, which shows a band which may assist with determining a distance in which a vehicle may stop. In response to the estimation/determination of these two bands, a bounding box 770 may be determined which illustrates a distance in which a vehicle may stop. As stated throughout this disclosure, the more information a system can use to determine/estimate a stopping distance (e.g., all axle loads vs. a portion of the axle loads), the smaller a bounding box 770 may be (e.g., the more accurate a system may be when estimating a stopping distance of a vehicle). As another example, an amount of tread on one or more tires may assist with creating a smaller bounding box/estimating a more accurate stopping distance.

In step 1308, an order of a platoon is determined. Often, it is desirable for a platoon of vehicles to not collide with each other when a hard brake occurs. To assist with this, vehicles may be ordered by their estimated stopping distance. Thus, a vehicle with the longest stopping distance may be at or near the front of a platoon. Conversely, a vehicle with a shorter stopping distance may be at or near the rear of a platoon. For example, if a platoon comprised three vehicles traveling at the same or substantially similar speeds (e.g., within 1-5 mph), wherein vehicle #1 stops in 450 feet, vehicle #2 stops in 390 feet, and vehicle #3 stops in 330 feet, a system may cause vehicle #1 to be at the front of the platoon, vehicle #2 to be in the middle of the platoon, and vehicle #3 to be at the rear of the platoon. Because this order is determined by the vehicle's respective estimated stopping distances, each of the three vehicles may have different weights, axle loads, brakes, etc., and the system described herein will still operate as intended.

In step 1310, a target gap is determined. In addition to an ordering of a platoon, an estimated stopping distance of at least one vehicle may be used to determine a target gap. As described above, it is desirable to avoid vehicle collisions. Thus, it is desirable for a target gap to be large enough such that a rear vehicle does not collide with a lead vehicle while platooning. Although in systems described herein platooning vehicles brake at a substantially same time (e.g., within 10 milliseconds), and each vehicle in the platoon may stop at a shorter distance than the vehicle in front of it, a target gap may still be determined and/or adjusted based on a stopping distance of a vehicle. For example, in some instances a vehicle's weight and additional information associated with stopping (e.g., axle load) may not provide enough information to determine a vehicle's stopping distance with enough precision. In such a case, it may be desirable to adjust a target gap. Moreover, in various embodiments, a target gap may be determined by one or more of a gross vehicle weight, axle loads, brake health, etc.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media, non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

This disclosure contains numerous references to a NOC, to various ECUs, and to one or more processors. According to various aspects, each of these items may include various kinds of memory, including non-volatile memory, to store one or more programs containing instructions for performing various aspects disclosed herein.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet (e.g., the NOC). These cloud-based services (e.g., software as a service, platform as a service, infrastructure as a service, etc.) may be accessible through a Web browser or other remote interface. Various functions described herein may be provided through a remote desktop environment or any other cloud-based computing environment.

While this disclosure has been described in terms of several aspects, there are alterations, modifications, permutations, and equivalents which fall within the scope of this disclosure. In view of the many alternative ways of implementing the methods and apparatuses of the present disclosure, it is intended that the following appended claims be interpreted to include all such alterations, modifications, permutations, and substitute equivalents as falling within the true scope of the present disclosure.

What is claimed is:
1. A method for determining an order of vehicles in a platoon, comprising:
determining, by one or more sensors in the first vehicle's suspension system, at least a partial axle load of a first vehicle, comprising:

determining a weight placed on a drive axle;
estimating a stopping distance of the first vehicle based at least in part on the determined at least a partial axle load; and
determining the position of the first vehicle in the platoon based on the stopping distance of the first vehicle.

2. The method of claim 1, wherein the position of the first vehicle is further determined based on a stopping distance of a second vehicle.

3. The method of claim 2, wherein the stopping distance of the second vehicle is based on at least a partial axle load of the second vehicle.

4. The method of claim 1, further comprising:
receiving information from a network operations center associated with a stopping distance of a second vehicle.

5. The method of claim 1, wherein estimating the stopping distance of the first vehicle is further based on a gross weight of the first vehicle.

6. The method of claim 1, wherein determining at least a partial axle load of the first vehicle further comprises:
determining a weight placed on a steer axle.

7. The method of claim 1, wherein determining the at least a partial axle load of the first vehicle further comprises:
determining a weight placed on a trailer axle.

8. The method of claim 1, wherein determining the weight placed on the drive axle comprises measuring an amount of pressure in a bellow.

9. The method of claim 1, wherein determining the weight placed on the drive axle comprises receiving information from a strain gauge.

10. The method of claim 1, further comprising:
determining a minimum target gap between the first vehicle and a second vehicle based at least in part on the at least a partial axle load of the first vehicle.

11. A method for choosing intervehicle spacing, comprising:
determining, by one or more sensors in a vehicle suspension system, at least partial information associated with an axle weight distribution; and
determining a minimum target gap between a first vehicle and a second vehicle based on the axle weight distribution.

12. The method of claim 11, wherein determining at least partial information associated with an axle weight distribution comprises:
determining an estimated gross vehicle weight.

13. The method of claim 11, wherein determining the minimum target gap between a first vehicle and a second vehicle based on the axle weight distribution comprises:
determining an estimated stopping distance bound.

14. The method of claim 13, wherein a vehicle maneuver is based on the estimated stopping distance.

15. The method of claim 11, wherein a vehicle maneuver is based at least in part on the determined axle weight distribution.

16. The method of claim 11, further comprising:
causing the first vehicle and the second vehicle to platoon, wherein an order of the first vehicle and the second vehicle is based on the axle weight distribution.

17. The method of claim 11, further comprising:
allowing the first vehicle and the second vehicle to platoon, based at least in part on the axle weight distribution.

18. A system for maintaining a determining a minimum target gap in a platoon, comprising:
at least one computer processor;
memory; and
a platooning engine executing on the at least one computer processor and configured to:
estimate, by one or more sensors in a first vehicle's suspension system, an axle load on a drive axle of the first vehicle;
estimate a stopping distance of the first vehicle based on an axle load of a drive axle; and
determine a minimum target gap in the platoon based on the stopping distance of the first vehicle.

19. The system of claim 18, wherein determining the minimum target gap in the platoon is further based on a stopping distance of a second vehicle.

20. The system of claim 18, wherein estimating a stopping distance of the first vehicle is further based on an axle load on a steer axle and an axle load on a trailer axle, and wherein the axle load on the steer axle, the axle load on the trailer axle, and the axle load on the drive axle are determined based on an amount of pressure in a bellow.

* * * * *